April 27, 1943.　　　J. S. PARSONS　　　2,317,552
ELECTRICAL DISTRIBUTION SYSTEM
Filed June 28, 1940　　　7 Sheets-Sheet 1

WITNESSES:
C. J. Weller
C. L. Friedman

INVENTOR
John S. Parsons.
BY
ATTORNEY

April 27, 1943.   J. S. PARSONS   2,317,552
ELECTRICAL DISTRIBUTION SYSTEM
Filed June 28, 1940   7 Sheets-Sheet 2

WITNESSES:
C. J. Weller
C. L. Freedman

INVENTOR
John S. Parsons.
BY
ATTORNEY

April 27, 1943. J. S. PARSONS 2,317,552
ELECTRICAL DISTRIBUTION SYSTEM
Filed June 28, 1940 7 Sheets-Sheet 3

WITNESSES:
C. J. Weller.
C. L. Freedman

INVENTOR
John S. Parsons.
BY
ATTORNEY

WITNESSES:
C. J. Weller.
C. L. Freedman.

INVENTOR
John S. Parsons.
BY
ATTORNEY

April 27, 1943.   J. S. PARSONS   2,317,552
ELECTRICAL DISTRIBUTION SYSTEM
Filed June 28, 1940   7 Sheets-Sheet 5

WITNESSES:
C. J. Weller.
C. L. Freedman.

INVENTOR
John S. Parsons.
BY
ATTORNEY

April 27, 1943.  J. S. PARSONS  2,317,552
ELECTRICAL DISTRIBUTION SYSTEM
Filed June 28, 1940  7 Sheets-Sheet 6

WITNESSES:
C. J. Weller.
C. L. Freedman

INVENTOR
John S. Parsons.
BY
ATTORNEY

April 27, 1943.    J. S. PARSONS    2,317,552
ELECTRICAL DISTRIBUTION SYSTEM
Filed June 28, 1940    7 Sheets-Sheet 7

WITNESSES:
C. J. Weller
C. L. Freedman

INVENTOR
John S. Parsons.
BY
ATTORNEY

Patented Apr. 27, 1943

2,317,552

UNITED STATES PATENT OFFICE 2,317,552

ELECTRICAL DISTRIBUTION SYSTEM

John S. Parsons, Swissvale, Pa., assignor to Westinghouse Electric & Manufacturing Company, East Pittsburgh, Pa., a corporation of Pennsylvania Application June 28, 1940, Serial No. 342,938

78 Claims. (Cl. 175—294)

This invention relates to electrical distribution systems and it has particular relation to network distribution systems of the type wherein a plurality of primary feeder circuits are employed for supplying energy to a common secondary network or grid circuit.

One of the major problems confronting the electrical industry is that of satisfactorily distributing alternating current to consumers in urban and medium density areas. Such distribution must not only provide reliable and continuous service, but the cost of the distribution system must justify its installation.

For more than ten years the most reliable alternating current distribution system for heavy density or urban areas has been that known as the Palmer system. In this system a plurality of high voltage primary feeder circuits are employed for supplying energy to a common low-voltage secondary network or grid circuit. Each of the feeder circuits is connected to the common network circuit through a plurality of network transformers and network protectors. Each of the protectors includes a directional relay for controlling the operation of the network protector. When a fault occurs on the network circuit, the flow of current to the fault does not actuate the directional relays and the fault is burned clear. The amount of energy available from the feeder circuits is so large that generally no difficulty is encountered in burning clear faults occurring on the network circuit.

When a fault occurs on a feeder circuit, the flow of current through the directional relays associated with the feeder circuit actuates the relays and trips the network protectors to disconnect the faulted feeder circuit from the network circuit. The sound feeder circuits continue to supply energy to the network circuit and substantially no impairment of service results from a fault occurring on any feeder circuit.

Although the Palmer type network distribution system provides service of excellent reliability and continuity, its cost so far has justified its adoption only in areas having a heavy density of energy consumption such as the metropolitan areas.

At present a large proportion of electrical energy is supplied to medium density areas through radial systems. Such systems are relatively low in cost but are unsatisfactory because of the relative unreliability of the service which they offer. For example, a failure of a single feeder in a radial system results in an inconvenient outage for the entire distribution circuit supplied by the feeder.

Somewhat improved service at low cost may be provided by banking transformers associated with a radial feeder. By placing the secondaries of the transformers in parallel a distribution circuit may be supplied therefrom with good voltage regulation, but the continuity of service for such a system is substantially no better than that obtained from the conventional radial system.

A second alternative is provided in a system described in Patents 1,979,353, 1,979,703, and 2,023,096, which are assigned to the Westinghouse Electric & Manufacturing Company. In this system the network protectors of the conventional Palmer system are replaced by low cost sectionalizing switches which open only when the system is deenergized. To this end, when a fault occurs on a feeder circuit the feeder circuit breakers open to deenergize completely the entire system. After the feeder circuit breakers open, the sectionalizing switches associated with the faulted feeder circuit also open. When the feeder circuit breakers reclose, only those sectionalizing switches associated with the sound feeders are closed.

Such a system may be installed at a relatively low cost. However, although the outages from such a system are of shorter duration than those encountered in a radial system of distribution, they affect a larger number of customers and occur more frequently for the reason that a fault on any feeder results in a short outage for the entire system. A second disadvantage of this system is that the feeders cannot be relied upon to supply radial loads or conventional network circuits connected in parallel with the simplified network shown in the aforesaid patents. These factors substantially restrict the field of application for this system.

In accordance with this invention, the conventional common network circuit or grid is replaced by a plurality of substantially independent secondary loop circuits. A plurality of primary feeder circuits are employed for supplying electrical energy through a plurality of network transformers to each of the loop circuits. The connections between the feeder circuits and each of the loop circuits are so disposed that when any feeder circuit is removed from service the load on the loop circuit is distributed substantially uniformly among the transformers associated with the remaining feeder circuits. By providing independent loop circuits, it is possible to isolate any loop without removing other loop circuits from service. Moreover, in starting operation on a dead or deenergized distribution system, it is possible to add loop circuits to the system successively as the conditions of the system permit.

A further aspect of this invention comprises the replacement of the Palmer-type network protector by inexpensive, rugged switches. Each of the network transformers is connected to its associated loop through a network switch which is designed to open only when substantially no current or little current flows therethrough. Between each pair of network transformers a sectionalizing switch is placed in the loop circuit. The sectionalizing switches open in advance of the network switch when a fault occurs on a feeder circuit associated therewith. Since the feeder circuit breaker also opens, the network switch is completely deenergized before it opens. As the network switch does not open a circuit carrying substantial current, its design may be appreciably simplified, and the network switch may, if desired, be placed in the casing of its network transformer. Moreover, due to the usual location of each sectionalizing switch midway between two adjacent transformers, the fact that the load is tapped off along the secondary loop circuit, and the fact that the transformer currents flow two ways from the transformers in the secondary loop circuit, each sectionalizing switch requires a current capacity of only 50 to 75% of the current rating of the largest adjacent transformer.

If a switching system designed in accordance with this invention were applied to a conventional network circuit, one network switch and about one and one-half sectionalizing switches would be required for each network transformer. However, with the loop system, only one network switch and one sectionalizing switch are required for each network transformer. As above indicated, the design and relaying of these switches may be appreciably simpler than those provided in the conventional network protector.

It is therefore, an object of this invention to provide a simple network distribution system.

It is a further object of this invention to provide a network distribution system having substantially independent secondary loop circuits.

It is a further object of this invention to provide a network distribution circuit energized through a plurality of network transformers and feeder circuits wherein on failure of any feeder circuit the load on the network circuit divides uniformly among the network transformers associated with the remaining feeder circuits.

It is another object of this invention to provide a network distribution system supplied by a plurality of feeder circuits through network switches wherein each of said feeder circuits is independently deenergized prior to an opening of the associated network switch.

It is a further object of this invention to provide a simplified switching system for a network distribution system.

It is a further object of this invention to provide for a plurality of feeder circuits a common distribution loop circuit which may be sectionalized for isolating a faulted feeder circuit.

It is a still further object of this invention to provide a network distribution system wherein network switches are employed which are not required to open a circuit carrying appreciable current.

Other objects of this invention will be apparent from the following description taken in conjunction with the accompanying drawings, in which.

Figure 1:
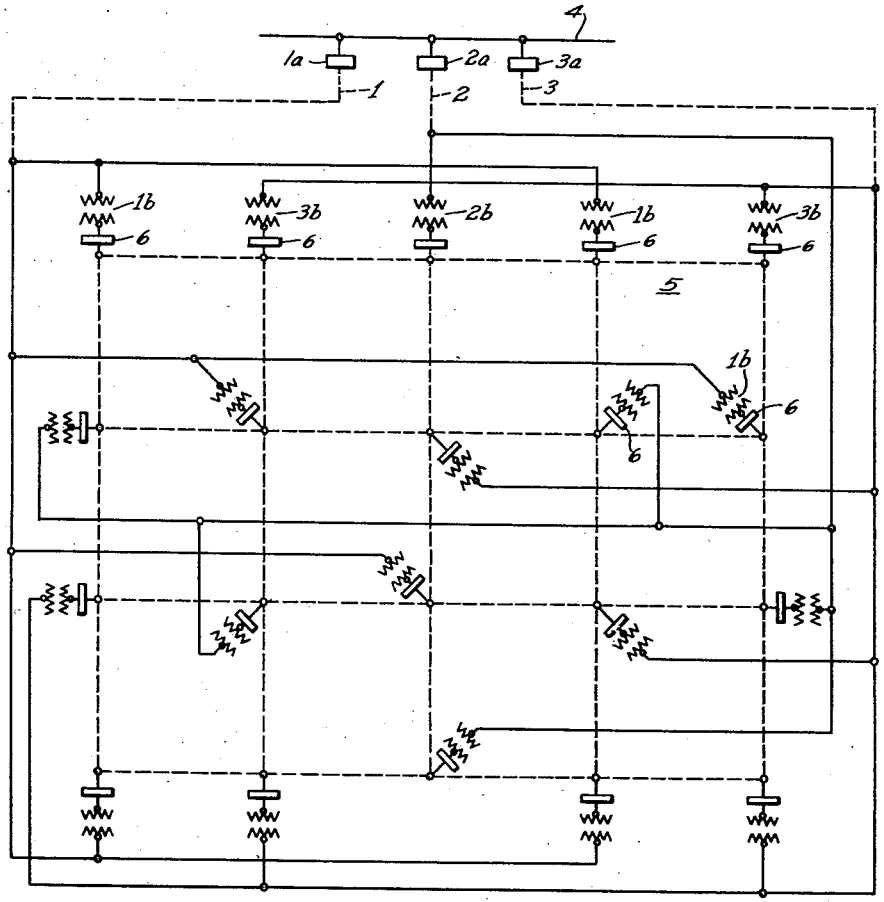
Figure 1 is a single line diagrammatic view of a network distribution system.

Referring to the drawings, Fig. 1 represents a conventional Palmer-type network distribution system. In this particular system, three feeder circuits 1, 2 and 3, are shown for supplying electrical energy from one or more sources here represented by a bus 4 to a common network circuit or grid 5 (shown in dotted lines). Each of the feeder circuits is provided with a feeder circuit breaker 1a, 2a and 3a for controlling the connection to and disconnection from the bus 4 of the feeder circuits. The feeder circuits also are connected through network transformers 1b, 2b and 3b which, if desired, may be of the high reactance network type, and through network protectors 6 to the network circuit 5. In order to keep down the spare transformer capacity required, it is the practice to interlace the feeder circuits as thoroughly as possible as illustrated in Fig. 1. It should be noted further that the entire network circuit 5 is rigidly connected together.

When a fault occurs on the network circuit 5, the fault is burned clear with no operation of the network protectors 6. Under these conditions the reactances of the network transformers prevent excessive feeder circuit currents from flowing.

If a fault occurs on one of the feeder circuits such as the feeder circuit 1, the directional relays of the network protectors 6 associated with all of the network transformers 1b operate to disconnect the feeder circuit 1 from the network circuit 5. In addition, the feeder circuit breaker 1a opens to disconnect completely the feeder circuit 1 from both the bus 4 and the network circuit 5. Energy for the network circuit then is supplied over the remaining feeder circuits 2 and 3. A more complete description of the network protectors and the operation of the system illustrated in Fig. 1 may be found by reference to my Patents Nos. 1,973,097, 1,997,597 and 2,013,836, which illustrate typical network relays and their operation.

As above explained, a system similar to that illustrated in Fig. 1 is excellent from the standpoint of reliability and service continuity. Its principal drawback is that of cost.

Figure 2:
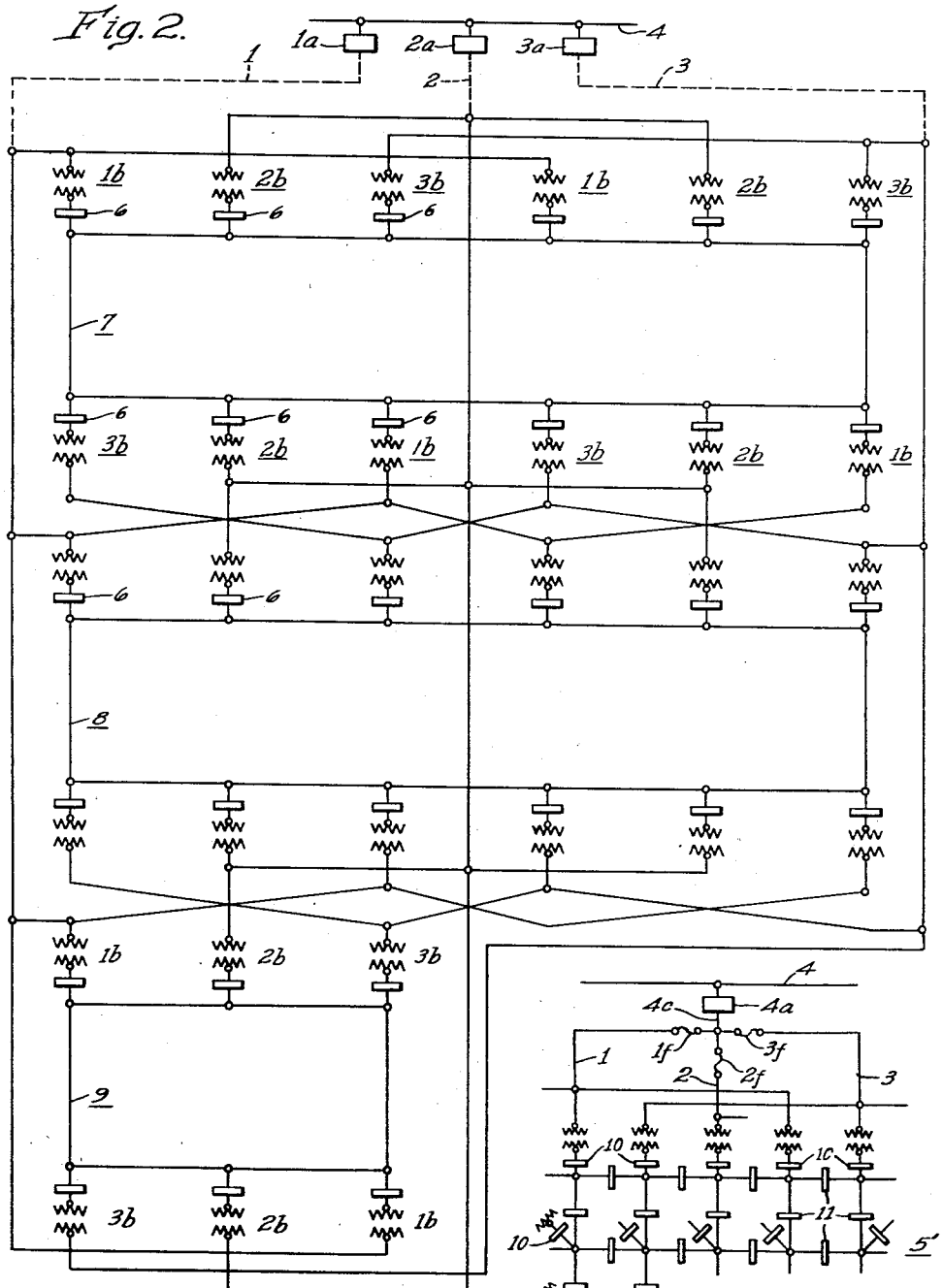
Fig. 2 is a single line diagrammatic view of a network distribution system embodying this invention.

In Fig. 2 a network distribution system is illustrated which departs somewhat from the conventional Palmer system. In Fig. 2 the feeder circuits 1, 2 and 3 are connected through their associated network transformers 1b, 2b and 3b to a plurality of substantially independent low-voltage loop circuits 7, 8 and 9. These loop circuits may be of the same dimensions or of different dimensions as illustrated by the short loop circuit 9 of Fig. 2. The various network transformers may be connected to the loops through network protectors 6 which may be of the conventional Palmer-type illustrated in my aforesaid patents. It will be understood that consumers of electrical energy are supplied with service from the various loop circuits.

To assure a uniform distribution of load among the various network transformers under different conditions, the network transformers are preferably connected to each loop circuit in an orderly group sequence as illustrated in Fig. 2. Moreover, in each loop circuit the impedance of the loop circuit between any pair of adjacent network transformers preferably is substantially equal to that of the loop circuit between any other pair of adjacent network transformers. This result may be obtained by proper spacing of the network transformers or by including impedances or reactors, if necessary, adjacent certain of the network transformers.

With the system illustrated in Fig. 2, if any of the feeder circuits such as the feeder circuit 1a is removed from service, the loads on the loop circuits will be divided evenly among the network transformers associated with the remaining feeder circuits.

Although the conventional network protectors such as those illustrated in my aforesaid patents provide ideal operation of the loop system illustrated in Fig. 2, such protectors are designed to open circuits carrying substantial current and their design is somewhat complicated and expensive. In order to simplify and reduce the cost of the network system, I have developed a completely new switching sequence which is illustrated diagrammatically in Fig. 3.

Figure 3:
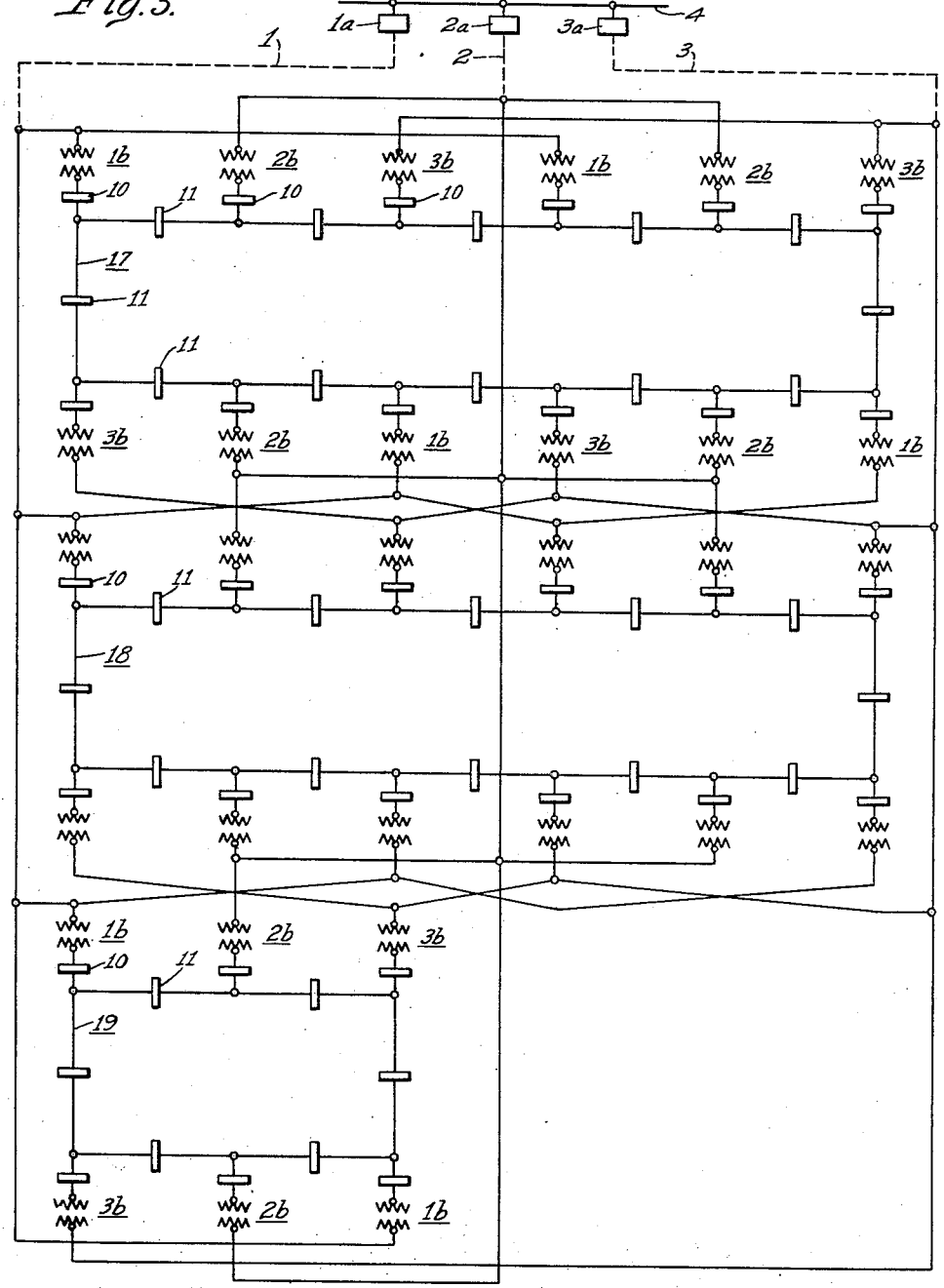
Fig. 3 is a single line diagrammatic view of a network distribution system embodying a modified form of this invention.

Referring to Fig. 3, a plurality of loop circuits 17, 18 and 19, which correspond to the loop circuits 7, 8 and 9 of Fig. 2, are energized from the three feeder circuits 1, 2 and 3 through the network transformers 1b, 2b and 3b. However, in place of the network protector 6 of Fig. 2, I provide a transformer switch or network switch 10 which is designed to open a circuit carrying substantially no current, or current not appreciably larger than rated load current.

Before actuation of the network switch 10 to its open condition, the network switch 10 is first isolated from any source of current. For this purpose each network switch 10 is separated from adjacent network switches by means of sectionalizing switches 11. When a fault occurs on any feeder circuit such as the feeder circuit 1, the sectionalizing switches 11 adjacent each of the associated network transformers 1b open in response to the excess flow of current from the loop circuits to the faulted feeder circuit. In addition, the feeder circuit breaker 1a also opens and completely deenergizes the network transformers 1b and the network switches 10 associated therewith. The network switches 10 are responsive to the deenergized condition of the associated network transformers 1b and open with substantially no current, or little current, flowing therethrough.

Preferably the sectionalizing switches 11 close automatically after a time delay to restore the loop circuits to their original condition for energization from the sound feeder circuits 2 and 3. Under this condition of energization the load on the loop circuits is divided evenly among the network transformers 2b and 3b.

If a fault occurs on a loop circuit, it is desirable that the fault burn clear without necessitating the tripping of any network switch or sectionalizing switch. Since most faults occurring on a network circuit or loop circuit clear in approximately one or two seconds, by providing the sectionalizing switches 11 with a suitable time delay, faults occurring on the loop circuits are permitted to burn clear.

In Figs. 2 and 3, certain circuits are illustrated by diagonal lines. This illustration is for the purpose of facilitating the tracing of circuits and has no other significance.

Should an internal fault occur on one of the network transformers, sufficient current to actuate the sectionalizing switches may now flow. To provide satisfactory performance under these conditions, it may be desirable to provide fuses for the terminals of the network transformers for blowing out when currents substantially larger than rated load currents pass therethrough for disconnecting the faulted network transformers after a predetermined time delay. The time delay should be sufficient to permit the various switches to respond first to currents flowing to feeder circuit faults.

Figure 4:
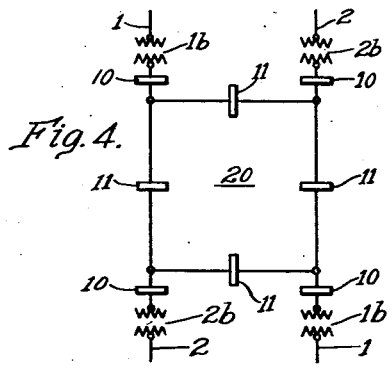
Figs. 4, 5, 6 and 7 are single line diagrammatic views of units of a distribution circuit unit embodying this invention.

Preferably, the system is constructed from a plurality of substantially similar units. For example, in Fig. 4 a typical unit 20 is disclosed for energization from two of the feeder circuits 1 and 2. The loop circuits are intended generally for operation in towns. Consequently, each loop circuit will have a width generally equal to the length of a town block and will have a length which is usually some multiple of the width of the loop circuit. In Fig. 4 the unit illustrated provides a loop circuit substantially one block square. This unit is desirable for applications in which consumers are supplied from each street surrounding a block. Under these circumstances, as many units such as 20 as desired may be energized from the feeder circuits 1 and 2 in the manner illustrated in Fig. 4.

Figure 5:
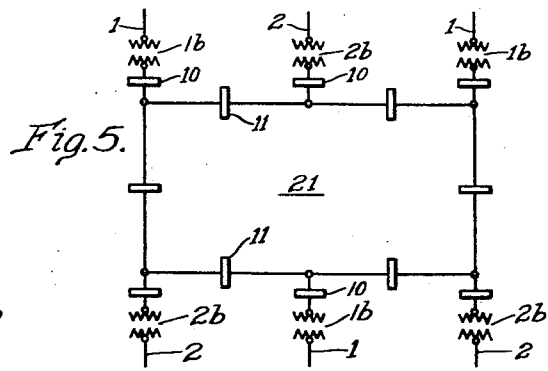

In many applications it may be sufficient to provide service on every street running in one direction and every other street running at right angles thereto. For such an application, units similar to a loop circuit unit 21, illustrated in Fig. 5, which are twice the length of the basic units illustrated in Fig. 4, may be utilized.

Figure 6:
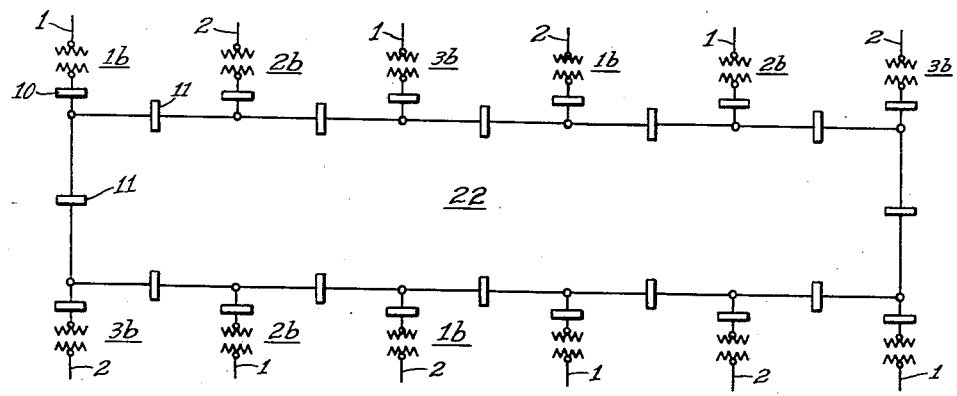

In Fig. 6 a loop circuit 22 is illustrated for energization from the two feeder circuits 1 and 2. This loop circuit 22 is five times the length of the basic units illustrated in Fig. 4. Consequently such a loop circuit provides service on adjacent streets running in one direction and on streets five blocks apart running at right angles thereto. In a similar manner, units may be designed to provide any desired service.

When one of the primary feeder circuits and its associated transformers are disconnected from a loop circuit, it is desirable that the loop circuit load divide uniformly among the transformers remaining in service. To this end the voltage drop from each serviceable feeder circuit to the normal connection points to the loop circuit of the disconnected transformers preferably should be substantially uniform.

In order to assure an even distribution of load in the systems thus far described, regardless of the number of feeder circuits in operation, it is desirable that the impedance between adjacent network transformers be substantially equal throughout the loop circuit and that the network transformers for the various feeder circuits be connected to the loop circuit in rotation. This equality of impedance may be obtained by proper spacing of the network transformers, or may be obtained by proper application of impedances or reactors adjacent certain of the network transformers for bringing the impedances therebetween to the proper value. When these precautions are observed the failure of any feeder circuit will cause the load on a loop circuit to divide evenly among the remaining effective network transformers.

Figure 7:
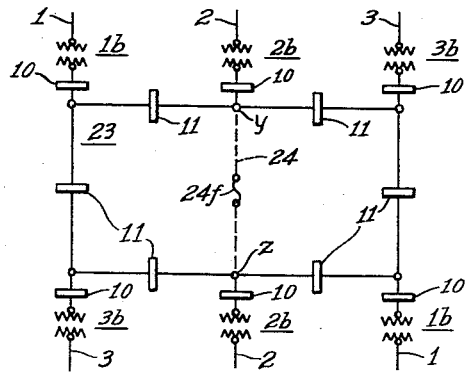

Probably the most common network system will employ three feeder circuits. A basic loop circuit unit 23 is illustrated in Fig. 7 for energization from the three feeder circuits 1, 2 and 3. It will be noted that this basic unit is approximately one block wide and two blocks long. Consequently, such a unit will provide service on each street running in one direction and on every other street running at right angles thereto. If it is desired to provide service on every street the mid-points $z$ and $y$ of the basic unit 23 may be connected by a tie circuit 24. This tie circuit will not affect appreciably the distribution of load among the operative network transformers when one of the feeder circuits is out of service. It will, however, increase the fault current when the fault occurs in certain parts of the loop circuit. As a rule, it is believed desirable to omit the tie circuit 24 and to serve the intermediate street radially from the points $z$ and $y$ or to provide a fuse $24f$ in the tie circuit 24 at or near its mid-point so that it will open quickly on any fault. As above indicated, the impedance between any pair of adjacent network transformers in Fig. 7 should be maintained substantially constant throughout the loop circuit.

Units similar to the unit 23 may provide loop circuits of different lengths. In general, the length of the loop circuit may be represented by the formula:

$$\left(\frac{x}{2}-1\right)$$

times the width of the loop circuit. In this formula $x$ represents a number divisible by both 3 and 2. Loop circuits built up in the same manner as the basic unit of Fig. 7 are illustrated in Figs. 2 and 3.

The loop circuits illustrated in Figs. 2 and 3 may be either single-phase or polyphase. If single-phase, they may be energized from a single-phase source or from a polyphase source. For example, if single-phase loop circuits are connected for energization from a three-phase source, one-third of the loop circuits would be connected for energization from each phase of the three-phase source. In such a system, by employing single-phase feeder circuit breakers, a failure of any phase will not impair service on the remaining operative phases.

If the switching system illustrated in Figs. 3 to 7 were employed on a conventional network or grid circuit, it would follow that substantially one network switch 10 and one and one-half sectionalizing switches 11 would be required for each network transformer. By adoption of the loop circuits illustrated in Figs. 2 to 7, this requirement is reduced to one network switch 10 and one sectionalizing switch 11 for each network transformer.

Special switches have been developed for controlling properly the loop circuits of Figs. 3 to 7. For example, in Fig. 8 a suitable network switch 10 is illustrated. In this figure a network transformer 1b, which may have fuses $f$ for its primary winding, is illustrated for supplying a three-wire, single-phase loop circuit. The network transformer 1b is connected to a loop circuit through a network circuit breaker 25. Under normal operating conditions this circuit breaker is held in its closed position by means of a latch 26 pivoted for rotation about a point 26a. This latch is biased away from its latching position against a stop 27 by means of a suitable biasing device such as a spring 28. The latch 26 is maintained in its latched position by means of two solenoids 29 and 30. One of these solenoids 30 is energized in accordance with the voltage across the secondary of the network transformer 1b through a circuit which may be traced from one terminal of the transformer secondary through a conductor 31, the front contacts of a pallet switch 32 carried by the circuit breaker 25, a conductor 33, the solenoid 30, a conductor 34, and a conductor 35 to a second terminal of the transformer secondary. The parts are so proportioned that with no current flowing in the secondary of the network transformer the latch 26 will trip when the voltage across the secondary of the network transformer falls below approximately 25 to 30% of its normal value.

When a fault occurs on a loop circuit adjacent a network transformer, the voltage across the secondary of the transformer may drop below 25 to 30% of its normal value. Under such conditions the solenoid 30 would fail to hold the latch 26 in its closed position and the circuit breaker 25 would trip while carrying substantial current. Since it is desirable that the circuit breaker 25 trip only when little or substantially no current flows therethrough, the second solenoid 29 is energized from current transformers 36 and 37 in accordance with current flowing in the secondary of the network transformer. The solenoid 29 is so designed that with three to five times normal rated load current flowing through the secondary of the network transformer 1b, and assuming zero voltage across the secondary of the network transformer, the solenoid 29 will hold the latch 26 in its closed position, and will permit tripping only for a lower current value. With this arrangement the circuit breaker 25 trips only when it is in a substantially deenergized condition, and it trips without appreciable time delay.

For maximum economy the network switches 10 may be provided only with manual reclosing mechanism. This means that whenever a network switch 10 trips a serviceman must manually reclose it after repairing any fault occurring on the feeder circuit associated therewith.

Figure 8:
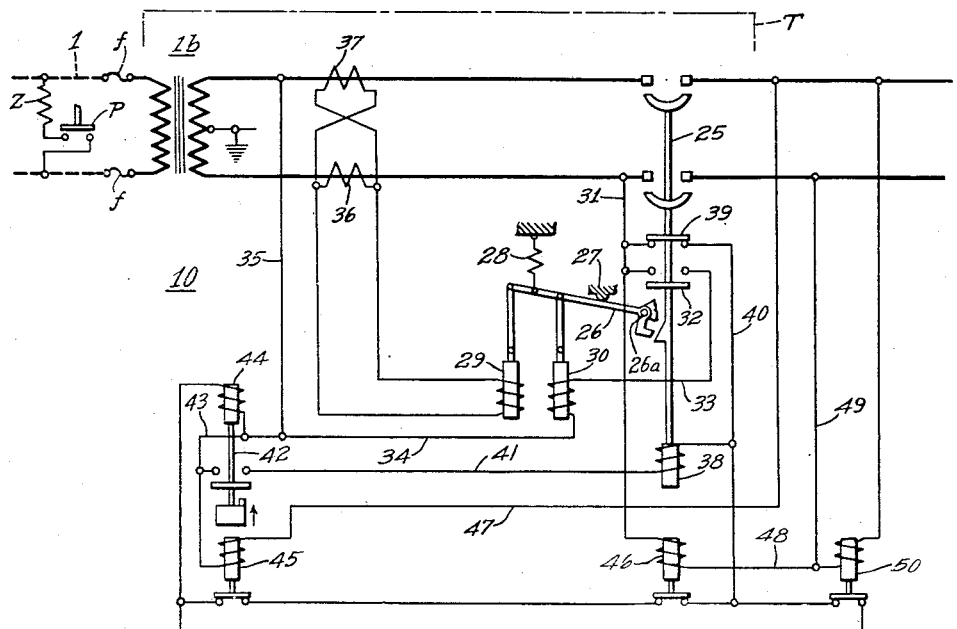
Fig. 8 is a diagrammatic view of a network switch embodying this invention.

Automatic reclosure of the network switches may be provided and generally is preferred. As illustrated in Fig. 8, a circuit breaker 25 is provided with a closing solenoid or motor 38. This closing solenoid is energized from the secondary of the network transformer through a circuit which may be traced from the conductor 31 through the back contacts of a pallet switch 39, a conductor 40, the closing solenoid 38, a conductor 41, front contacts of a timing relay 42, a conductor 43 and the conductor 35.

The purpose of the timing relay is to prevent reclosure of the network switch 10 during those periods when the feeder circuit breaker associated with the feeder circuit 1 is closed on a reclosing cycle. On a typical reclosing cycle a feeder breaker may be reclosed first instantaneously, second, after a ten second delay, and third, after a fifteen second delay followed by a lockout of the circuit breaker if the fault on the feeder circuit does not clear during a portion of the reclosing cycle. With such a setting of the feeder circuit breaker, the timing relay 42 should completely reset in somewhat less than ten seconds, for example, in about eight seconds. To this end the timing relay 42 may interpose a time delay of three to six seconds in the closing of the network switch 25 and may reset for a subsequent operation in approximately eight seconds or less. With such a timing of the relay 42, the full delay of three to six seconds, to prevent reclosing while the feeder breaker is closed during its reclosing cycle, is available at the beginning of each reclosure of the feeder circuit breaker and the network switch 25 will not close unless the feeder circuit breaker closes and remains closed.

The timing relay 42 is energized in accordance with the voltage across the secondary of the network transformer 1b. It is adjusted to close in response to voltages above approximately 90% of the normal voltage. The timing relay 42 may be provided with a closing solenoid 44 connected directly across the secondary of the network transformer. Such a connection will not prevent the circuit breaker 25 from closing when the polarity across the terminals of the circuit breaker 25 is incorrect. In many applications a phasing control for the network switch 10 is not justified and in those applications the solenoid 44 may be connected as above indicated, directly across the secondary of the network transformer 1b.

For those installations in which a phasing control is desired, a pair of phasing relays 45 and 46 are connected across the terminals of the circuit breaker 25. The energizing circuit for the phasing relay 45 may be traced from the conductor 35 through the conductor 43, the phasing relay 45 and the conductor 47 to the opposite side or loop-circuit side of the circuit breaker 25. The connections for the phasing relay 46 may be traced from the conductor 31 through the phasing relay 46, a conductor 48 and a conductor 49 to the opposite or loop-circuit side of the circuit breaker 25. The back contacts of both of the phasing relays 45 and 46 are included in the closing circuit for the timing relay 42. This closing circuit may be traced from the conductor 35 through the solenoid 44 of the timing relay, the back contacts of the phasing relays 45 and 46, the conductor 40, the pallet switch 39 and the conductor 31. Consequently, if the polarity across either pair of terminals of the circuit breaker 25 is incorrect, one of the phasing relays 45 will remain open and will prevent energization of the timing relay 42. Under these circumstances the circuit breaker 25 will not reclose. The phasing relays 45 and 46 are adjusted to open their back contacts when a voltage in excess of a predetermined small value exists across either pair of terminals of the circuit breaker 25.

For the conditions in which a circuit breaker 25 is to be closed on a dead network circuit or loop circuit, a separate relay 50 is provided for by-passing the phasing relays 45 and 46. The relay 50 establishes an energizing circuit for the timing relay 42 which may be traced from the conductor 35 through the coil of solenoid 44 of the timing relay, the conductor 51, the back contacts of the relay 50, the conductor 40, the back contacts of the pallet switch 39 and the conductor 31. When the network or loop circuit is deenergized, the relay 50 closes its back contacts, thereby establishing an energizing circuit for the timing relay 42 and the circuit breaker consequently closes regardless of the condition of the phasing relays 45 and 46. The relay 50 is energized in accordance with the voltage present on the loop-circuit side of the circuit breaker 25.

Since the network switch 10 is not called on to break a current, it may be enclosed in the same tank T (partly outlined in broken lines) with the network transformer 1b, and the circuit breaker 25 may be immersed in the liquid employed for insulating and cooling the network transformer.

Figure 9:
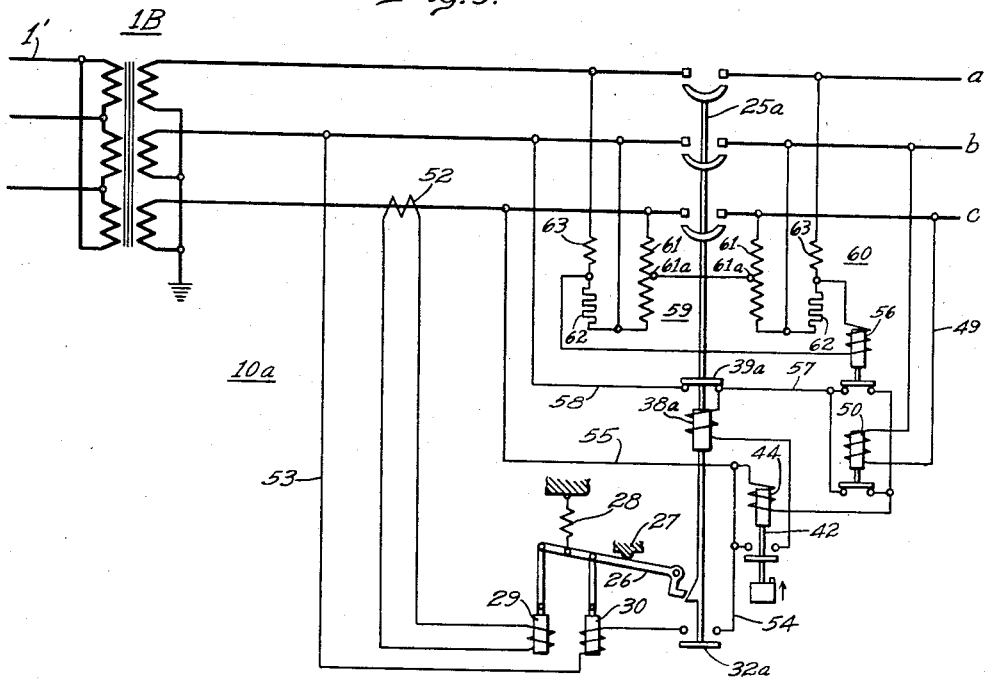
Fig. 9 is a diagrammatic view of a modified network switch embodying this invention.

In Fig. 9, I have illustrated a modified network switch 10a which is designed for a three-phase distribution system. In Fig. 9, a three-phase feeder circuit 1' supplies a network circuit or loop circuit through a three-phase network transformer 1B. A circuit breaker 25a is employed for the three-phase system which corresponds to the circuit breaker 25 of Fig. 8 and is controlled by the same latching mechanism illustrated in Fig. 8. In Fig. 9, however, the current solenoid 29 is energized from a single current transformer 52, and the voltage solenoid 30 is energized from one phase of the secondary of the network transformer 1B. The energizing circuit for the voltage solenoid 30 may be traced from a conductor 53 through the voltage solenoid 30, front contacts of a pallet switch 32a carried by the circuit breaker, a conductor 54 and a conductor 55. The operation of the latching mechanism is similar to that described with reference to Fig. 8. In Fig. 9 the parts 25a, 32a, 38a and 39a correspond to the parts 25, 32, 38 and 39 of Fig. 8.

The circuit breaker 25a of Fig. 9 may be manually reclosed, but preferably, as illustrated, an automatic reclosing system is employed. This reclosing system employs the timing relay 42 of Fig. 8, which is energized in Fig. 9 through a circuit which may be traced from the conductor 55 through the coil of solenoid 42 of the timing relay, the back contacts of a phasing relay 56, a conductor 57, the back contacts of the pallet switch 39a and a conductor 58. The timing relay 42 consequently is responsive to the voltage across one phase of the three-phase circuit and operates in the same manner discussed with reference to Fig. 8.

Although a phasing system need not be employed in Fig. 9, a phasing relay 56 is illustrated for completeness. This relay 56 is energized in accordance with the outputs of two positive phase-sequence voltage filters 59 and 60. The positive phase-sequence voltage filter 59 is connected on the transformer side of the circuit breaker 25a and is connected to provide an output proportional to the positive phase-sequence voltage of the feeder circuit. The positive phase-sequence voltage filter 60 is connected on the network or loop circuit side of the circuit breaker 25a and is connected to have an output proportional to the positive phase-sequence voltage of the network or loop circuit. The outputs of the voltage filters are connected so that the phasing relay 56 is energized by the difference of the output voltages of the two filters 59 and 60. If, during repairs of the feeder circuit 1', two phase conductors are interchanged or all conductors are rotated, the outputs of the two positive phase sequence voltage filters are no longer substantially equal and in phase, and the phasing relay 56 opens its contacts to prevent closure of the circuit breaker 25a.

The construction of the positive phase-sequence voltage filters may be similar to that illustrated in the Lenehan Patent No. 1,936,797, which is assigned to the Westinghouse Electric & Manufacturing Company. Each of these voltage filters comprises, in general, an autotransformer 61 having a 40% tap 61a, a resistor 62 and a reactor 63. The various elements of each filter are so related that the voltage drop across the resistor 62 is equal to the same percentage of the total voltage impressed on the resistor 62 and the reactor 63 in series as the ratio of the autotransformer 61, but lags the total voltage impressed on the resistor and reactor by 60°. Assuming the phase rotation of the three-phase system to be in the order a, b, c, as indicated in Fig. 9, the outputs of the voltage filters will be proportional to the desired positive phase-sequence voltages.

The relay 50 for controlling the closure of the circuit breaker 25a on a dead network or loop circuit also is employed in Fig. 9.

The sectionalizing switch 11 is somewhat different in construction. As above indicated, a sectionalizing switch is located between two network transformers. Because of its location, the capacity of the sectionalizing switch need be only 50 to 75% of the capacity of the largest of the two adjacent network transformers. The sectionalizing switch is designed to trip for a flow of power in either direction therethrough. Moreover the sectionalizing switch is designed to reclose when a suitable voltage is present on either side of the switch. A suitable construction is illustrated in Fig. 10.

Figure 10:
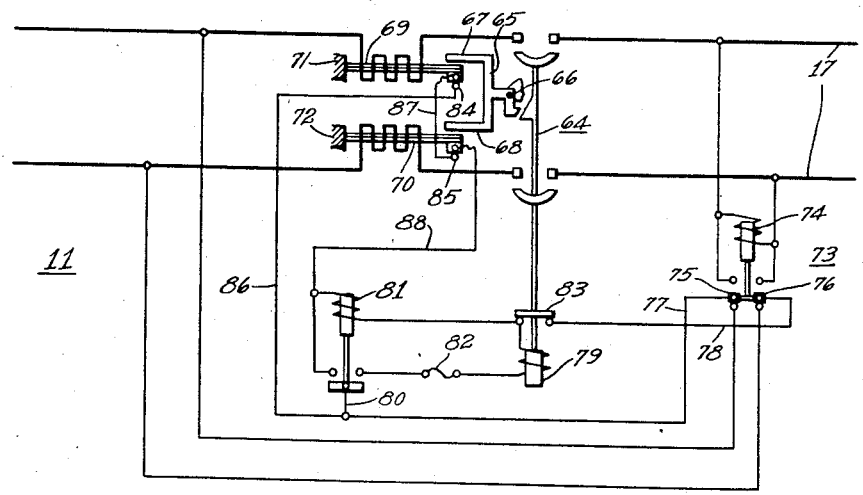
Fig. 10 is a diagrammatic view of a sectionalizing switch embodying this invention.

Referring to Fig. 10, the sectionalizing switch 11 includes a circuit breaker 64 for connecting two portions of the loop circuit 17. The circuit breaker 64 is maintained in a closed position by means of a latch 65 which is pivoted for rotation about a point 66. The latch 65 is provided with two tripping legs 67 and 68 which are positioned in the paths of travel of two thermal elements 69 and 70. These thermal elements are designed to be heated by current flowing in the conductors of the loop circuit 17. Although heat for the thermal elements may be provided in various manners, in the illustration current passing through the conductors of the loop circuit 17 passes directly through the heaters of the thermal elements. As the thermal elements heat, they tend to move relative to fixed supports 71 and 72 into engagement with the tripping legs 67 and 68. The thermal elements may take various forms, but as illustrated they are bimetallic elements. In the specific illustration, the two conductors of the loop circuit 17 in Fig. 10 are the main conductors of a three wire system. As above explained, the invention is applicable to various systems, such as two wire, multi-wire, single phase and polyphase systems.

Excessive current may flow through the heaters for the thermal elements either for an internal loop circuit fault or for an external feeder circuit fault. Ordinarily it is desirable that internal or loop circuit faults burn themselves clear. Most of these internal faults will burn clear in one or two seconds. Consequently, the thermal elements 69 and 70 are provided with a time delay, preferably an inverse time delay, with a minimum operating time of two to two and one-half seconds when maximum current flows to a fault occurring in the secondary or loop circuit 17. This provides adequate time for clearance of the usual secondary or loop circuit fault. The thermal elements 69 and 70 may be adjusted to trip the circuit breaker 64 in response to currents in excess of 60 to 100% of the full load current of the larger of the two network transformers adjacent the sectionalizing switch 11. Preferably, each sectionalizing switch 11 closes automatically.

For automatically closing the sectionalizing switch 11, it is desirable that the circuit breaker 64 close when sufficient voltage is present on either side of the circuit breaker. To this end a transfer relay 73 is provided for energizing the closing circuit of the circuit breaker 64 from either side of the circuit breaker. In the form illustrated the transfer relay includes a solenoid 74 which is connected for energization in accordance with the voltage present on one side of the circuit breaker 64. This transfer relay is adjusted to pick up and close its front contacts when energized by a voltage greater than 70 to 75% of normal. It is designed to drop and engage its back contacts when the energizing voltage drops below 25 to 50% of normal. The front contacts are connected to the loop circuit 17 on one side of the circuit breaker 64 and the back contacts are connected to the loop circuit 17 on the opposite side of the circuit breaker 64. In the form illustrated, the transfer relay 73 is provided with a movable contact member having two insulated contacts 75 and 76 for selectively engaging the front or back contacts of the relay. The movable contacts 75 and 76 are connected through suitable conductors 77 and 78 to energize the closing mechanism of the circuit breaker 64. It will be observed that if the voltage applied to the solenoid 74 is in excess of 70 to 75% of normal, the conductors 77 and 78 are connected, respectively, to the conductors of the loop circuit 17 on the right of the circuit breaker 64. If the voltage applied to the solenoid 74 drops below 25 to 50% of normal, the conductors 77 and 78 are connected, respectively, to the conductors of the loop circuit on the left of the circuit breaker 64. Consequently, the closing circuit for the circuit breaker will be energized even though either portion of the loop circuit is deenergized.

Reclosure of the circuit breaker 64 is effected through a closing motor or solenoid 79. The closing circuit for the solenoid 79 may be traced from the movable contact 75 through the conductor 77, a conductor 80, contacts of a closing relay 81, a fuse 82, the solenoid 79, a pallet switch 83 carried by the circuit breaker and the conductor 78 which is connected to the second movable contact 76.

In order to provide adequate time for operation of the network switches 10, it is desirable that the circuit breaker 64 be closed only after the expiration of a suitable time delay such as four to six seconds. In the embodiment illustrated in Fig. 10, this time delay is provided by the thermal elements 69 and 70 which have back contacts 84 and 85. After an actuation of either of the thermal elements 69 and 70 into tripping condition, a delay of four to six seconds is required before the thermal elements reengage their back contacts 84 and 85. These back contacts are included in the closing circuit for the circuit breaker 64.

The energizing circuit for the closing relay 81 may be traced from the movable contact 75 through the conductor 77, a conductor 86, the back contact 84, a conductor 87, the back contact 85, a conductor 88, the solenoid of the closing relay 81, the pallet switch 83 and the conductor 78 back to the second movable contact 76. This closing relay 81 is adjusted to close its front contacts and seal itself closed, in response to a voltage above approximately 80 to 85% of normal.

When the closing relay 81 actuates to close its front contacts, it establishes a closing circuit for the closing solenoid 79 as above described.

If a fault occurring on the secondary or loop circuit 17 should persist for more than two or two and one-half seconds, the circuit breaker 64 closes and trips at intervals of approximately six to eight seconds. If it is desired to eliminate excessive operation or "pumping" of the circuit breaker 64 under these circumstances, a fuse 82 may be included in the closing circuit of the circuit breaker. This fuse may be so proportioned that it blows and opens the closing circuit after six to twelve immediately consecutive operations of the circuit breaker 64 in response to the cumulative intermittent energization thereof. This should provide ample opportunity for any usual secondary or loop circuit fault to burn itself clear.

From the foregoing discussion it is believed that the operation of a distribution system similar to that disclosed in Fig. 3 is apparent. Assuming that the system is in operation and energized from all three feeder circuits, each of the loop circuits 17, 18 and 19 will carry load in a manner analogous to that of the conventional secondary network circuit. If a fault occurs on any of the loop circuits, current will be supplied to the fault for a minimum period of two to two and one-half seconds. If the fault fails to burn itself clear within this period, the sectionalizing switches adjacent the fault trip. About four to six seconds later these sectionalizing switches reclose and remain closed for another two to two and one-half seconds. If the fault again fails to burn itself clear, the sectionalizing switches again open and continue to "pump" slowly until the fault clears or for approximately six to twelve cycles at which time the fuses 82 associated with these sectionalizing switches blow to prevent further closure thereof. The sound portions of a loop circuit then continue to supply load to all but a small portion of a load adjacent the fault.

If a network transformer directly connected to the faulted section of the loop circuit is provided with fuses having a long time delay, so that the sectionalizing switches will trip first on any fault, the fuses will blow if the fault fails to burn clear within the time provided by the fuse setting.

If a fault occurs on one of the feeder circuits such as the feeder circuit 1, at the expiration of the two to two and one-half seconds minimum, the sectionalizing switches adjacent each of the network transformer switches 1b open to disconnect the feeder circuit 1 from the remainder of the loop circuits. In addition the feeder circuit breaker 1a, which is provided with a conventional tripping control, opens to deenergize completely the feeder circuit 1, the network transformers 1b and the network switches 10. The network switches 10, in response to this deenergization trip to disconnect the feeder circuit 1 from the loop circuits.

At the expiration of four to six seconds the sectionalizing switches 11 adjacent each of the network transformers 1b reclose to restore the loop circuits to their original condition. The entire loop circuits then continue to supply load from the network transformers associated with the sound feeder circuits 2 and 3, the load being uniformly distributed among these network transformers.

Following its tripping, the feeder circuit breaker 1a promptly recloses. If the fault on the feeder circuit has cleared itself prior to the reclosure, the feeder circuit breaker remains closed. At the expiration of approximately three to six seconds the network switches 10 associated with the network transformers 1b reclose to restore full service to the loop circuits 17, 18 and 19.

If the fault on the feeder circuit 1 fails to clear prior to the first reclosure of the feeder circuit breaker 1a, the feeder circuit breaker again trips prior to reclosure of the network switches 10 associated with the network transformers 1b. After the expiration of ten seconds, the feeder circuit breaker 1a again closes. If the fault has cleared in the meantime, the network switches 10 associated with the network transformer 1b will close at the expiration of three to six seconds to restore full service for the loop circuits. Assuming that the fault has not cleared, the feeder circuit breaker 1a again trips out and at the expiration of fifteen seconds the same cycle is repeated.

After three reclosures, if the fault persists, the feeder circuit breaker 1a is permanently locked out, and the feeder circuit 1 is permanently disconnected from the bus 4 by the feeder circuit breaker 1a and from the loop circuits by the associated network switches 10.

Although the system illustrated in Fig. 3 does not offer a continuity of service fully equal to that of the system illustrated in Fig. 1, it is a great improvement over the radial system of distribution, it is extremely flexible, and is an economical system to install.

Referring to Fig. 1, it should be noted that each protector 6 may be replaced by a network switch 10. A sectionalizing switch 11 should be provided in the network secondary or grid between each pair of network switches. As before indicated, such a system, though operable, is not as suitable for certain applications as the system illustrated in Fig. 3.

If desired, an artificial fault may be established for a feeder circuit by an opening of a feeder circuit breaker in order to ensure operation of all network switches associated with the feeder circuit whenever the feeder circuit breaker opens. This is represented in Fig. 8 by a pallet switch P carried by the feeder circuit breaker 1a which closes its back contacts when the feeder circuit breaker opens. Such a closure establishes an artificial fault across the feeder circuit 1 through a suitable current limiting impedance Z.

Figure 11:
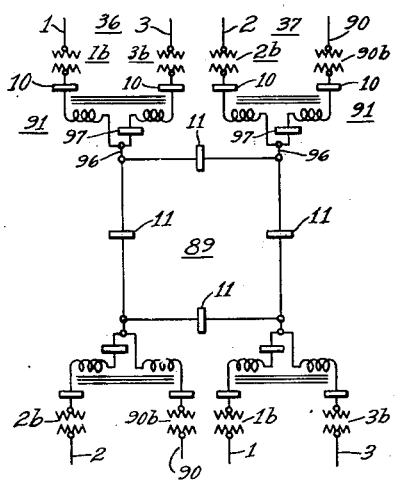
Figs. 11 and 12 are single line diagrammatic views of modified network circuit units embodying this invention.

When more than three feeder circuits are employed for supplying energy to a loop circuit, the connections therebetween take a different form. Referring to Fig. 11, a loop circuit unit 89 is energized from the three feeder circuits 1, 2 and 3 and from a fourth feeder circuit 90 through the network transformers 1b, 2b and 3b and network transformers 90b. Network switches 10 and sectionalizing switches 11 are employed in a manner analogous to that discussed with reference to the preceding figures.

Figure 12:
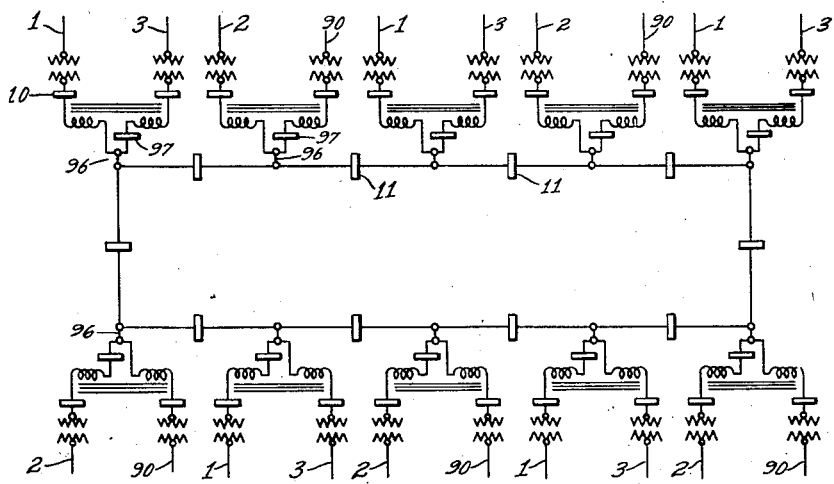

Fig. 12 discloses an expansion of the unit 89 of Fig. 11 into an elongated loop circuit in a manner heretofore discussed.

It will be noted that the feeders are divided into groups. In the specific illustration the feeders are paired, each pair being connected to the loop circuit unit 89 at a single point. The connections for each pair of feeder circuits are effected through suitable reactors 91 having a construction similar to that illustrated in Fig. 13.

Figure 13:
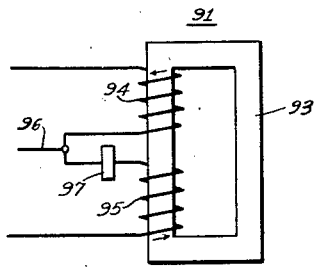
Fig. 13 is a diagrammatic view of a two-winding reactor suitable for the network circuit unit of Fig. 11.

Referring to Fig. 13, a reactor 91 includes a magnetic core 93 provided with two windings 94 and 95. A corresponding conductor of each of the paired feeder circuits such as the feeder circuits 1 and 3 is connected to each of the windings 94 and 95 and the inner terminals of the windings 94 and 95 are connected to a common conductor 96 which, in turn, is connected to the loop circuit unit 89. The direction of flow of current in the windings 94 and 95 under normal operating conditions is such that the magnetomotive forces produced thereby are in opposition. Consequently, substantially no impedance is offered to the flow of current therethrough. An instantaneous direction of current flow for the two windings is illustrated in Fig. 13 by arrows. In order to provide for proper operation of the feeder circuit 1 when a fault occurs on the feeder circuit 3, or vice versa, an auxiliary switch 97 is provided between the windings 94 and 95.

Figure 14:
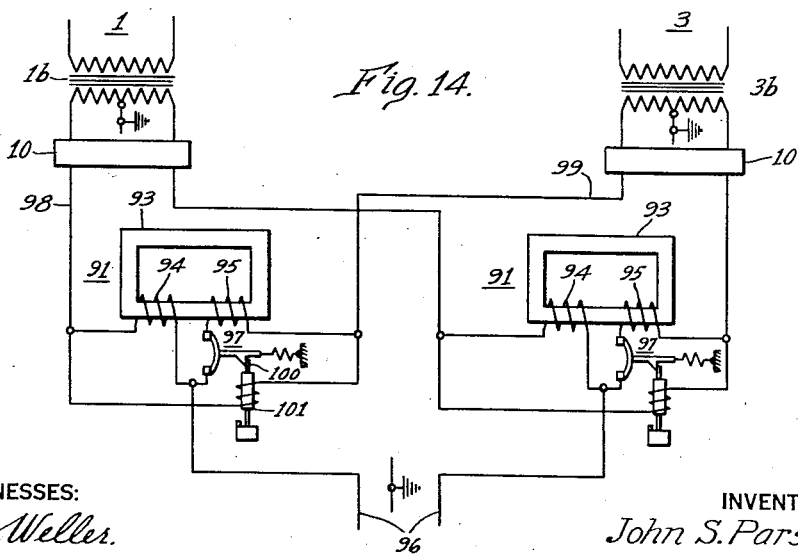
Fig. 14 is a diagrammatic view showing in greater detail connections suitable for the unit illustrated in Fig. 11.

The purpose of the reactor 93 may be understood more readily by reference to Fig. 14. In Fig. 14 a pair of network transformers 1b and 3b associated with feeder circuits 1 and 3 are illustrated, together with their network switches 10. Since these two transformers are connected to a loop circuit at one point each will have approximately one-half the capacity of a single network transformer if it were possible to employ the single transformer at the same point. The two network transformers 1b and 3b, together with the associated equipment, as a rule, would be placed in a single underground vault if an underground system is employed. Although the invention may be applied with various single-phase and polyphase connections, Fig. 14 represents network transformers for three-wire, single-phase service.

It will be noted in Fig. 14 that corresponding terminals 98 and 99 of the network transformers 1b and 3b are connected, respectively, to the windings 94 and 95 of a single reactor 93. During normal operation with both feeder circuits in service the reactance offered to the flow of current by the reactor 93 is substantially zero. If a fault occurs on one of the feeder circuits such as the feeder circuit 3, current would flow from the network transformer 1b to the feeder circuit 3 through the reactor 93. Since the magnetomotive forces produced by the windings 94 and 95, when energized by currents circulating from the transformer 1b to the feeder circuit 3, are in the same direction, the reactor 93 offers substantial impedance to the flow of such circulating current.

With current flowing into a loop circuit from only one of the transformers 1b or 3b, the impedance offered by the reactor 93 preferably should be approximately one-fourth of the impedance of the secondary main or loop circuit between adjacent points of connection of the conductors 96 (see Fig. 11). With such a value of impedance, the impedance offered by the reactor to circulating current is equal substantially to the impedance between the points of connection of the conductors 96. Moreover, with such an impedance, if one of the feeder circuits such as the feeder circuit 3 is out of service, the secondary or loop circuit load is divided evenly among the network transformers associated with the remaining feeder circuits.

The purpose of the auxiliary switches 97 is to interrupt the flow of circulating current between the two feeder circuits 1 and 3 in the event that a fault occurs on one of the feeder circuits. To this end the switch 97 may be similar in construction to the sectionalizing switch 11 heretofore described except that the switch 97 is provided with a longer time delay in opening, such as four seconds. This longer time delay will prevent unnecessary operation of the auxiliary switch 97 for certain faults occurring on the loop circuit which do not burn clear promptly or for faults occurring on a distant feeder circuit. With this construction, the switch 97 recloses when sufficient voltage is supplied thereto from either of the transformers 1b or 3b, or from the loop circuit.

As illustrated in Fig. 14, however, the auxiliary switches 97 are tripped in response to the voltage across the two windings of the reactor 93 in series. As above explained, the impedance offered by the two windings 94 and 95 to circulating current is substantially greater than the impedance offered by the windings under normal conditions of operation or under conditions in which only one of the feeder circuits 1 or 3 is in operation. Consequently, the voltage at which the auxiliary switch 97 trips may be selected to have a value exceeding that present during operation of only one feeder circuit or normal operation of both feeder circuits in parallel. For the purpose of illustration, the auxiliary switch 97 is provided with a latching member 100 carried by a solenoid 101 which operates with time delay. When the voltage applied to the solenoid 101 rises above a predetermined value, the solenoid operates to unlatch the auxiliary switch 97. The reclosing mechanism for this switch may be similar to that disclosed for the sectionalizing switch 11.

The operation of the system illustrated in Figs. 11 and 14 may be set forth as follows: under normal conditions electrical energy is supplied from both of the feeder circuits 1 and 3, and the reactors 91 offer substantially no impedance to the flow of current therethrough.

Should a fault occur on one of the feeder circuits 1 or 3, such as the feeder circuit 1, current would flow to the fault from the secondary loop circuits associated therewith, and circulating current would flow from the feeder circuit 3 through the reactors 91 to the fault. As above explained, the reactors 91 offer substantial impedance to the flow of this circulating current. Also the reactance of the network transformers tends to restrict the circulating current.

After a time delay of about two or two and one-half seconds, the flow of current from the secondary loop circuits to the fault trips the sectionalizing switches 11 adjacent the points of connection 96 of the pairs of feeder circuits 1 and 3 to the loop circuits. About the same time, the excessive voltage across the reactors 91 produced by the circulating current trips the auxiliary switches 97. The network switches 10 associated with the feeder circuits 1 and 3 now are substantially disconnected from the secondary loop circuits.

The feeder circuit breaker 1a associated with the feeder circuit 1 also trips as a result of the fault thereon. Consequently, the network switches 10 associated with the feeder circuit 1 are completely deenergized and trip, thereby removing the feeder circuit 1 from service.

After the expiration of a time delay of about 4 to 6 seconds, the open sectionalizing switches 11 close to restore the complete loop circuits for energization from the sound feeder circuits.

Voltage being applied to the transfer relays of the open switches 97, from the feeder circuit 3, these switches close at the expiration of their closing time delays, and the feeder circuit 3 supplies energy to the loop circuits. Because of the impedance offered by one of the reactor windings 95, and the substantially uniform impedance of the loop circuits between adjacent points of connection 96, all transformers associated with sound feeders uniformly divide the energy supplied to the loop circuits.

The feeder circuit breaker 1a and the network switches 10 associated with the feeder circuit 1 may cooperate for a reclosing cycle as discussed above for Figs. 1 to 7. When the feeder circuit 1 clears, and the circuit breaker 1a together with the open network switches reclose, the feeder circuit resumes its proper supply of energy to the loop circuits.

Although the foregoing discussion of the operation of the system illustrated in Figs. 11 and 14 is with particular reference to a fault occurring on the feeder circuit 1, a somewhat similar operation results from a fault occurring on the feeder circuit 3. The sectionalizing switches adjacent the points of connection of the pairs of feeder circuits 1 and 3 operate as before to isolate these feeder circuits from the remaining feeder circuits, and to restore the loop circuits for operation from the sound feeder circuits.

Circulating currents flowing from the feeder circuit 1 to the fault on the feeder circuit 3 provide sufficient voltages across the associated reactors 91 for tripping the auxiliary switches 97 after the expiration of the required time delay. This is followed by the tripping of the network switches 10 of the feeder circuit 3.

When the sectionalizing switches reclose, the feeder circuit 1 is in condition for supplying power to the loop circuits. Since the network switches of the feeder circuit 10 are open, reclosure of the auxiliary switches 97 has substantially no effect on the supply of power to the loop circuits. Such reclosure, however, conditions the system for energization from the feeder circuit 3 when the circuit is restored for service.

Some simplification of the system disclosed in Fig. 11 may be effected by eliminating those network switches 10 which are in series with the auxiliary switch 97, and by moving the auxiliary switches 97 to the positions occupied by the eliminated network switches. In such a case the switches 97 may be designed similarly to switches 11 except that they reclose only when the voltage on their transformer side is greater than about 80 to 85% of normal; that is, the transfer relay 73 of Fig. 10 would not be required for the auxiliary switches 97 when these replace the series network switches 10. A system of this general type is illustrated in Fig. 16 and will be discussed further below.

Figure 15:
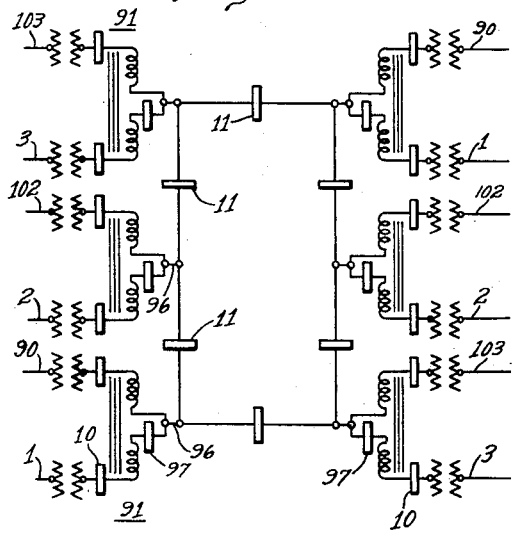
Figs. 15 and 16 are single-line diagrammatic views showing modified distribution circuit units embodying this invention.

In Fig. 15 I have illustrated a secondary or loop circuit unit employing six primary feeder circuits which include the feeder circuits 1, 2, 3 and 90 and two additional feeder circuits 102 and 103. These feeder circuits are paired in the same manner illustrated in Figs. 11 to 14. However, the reactors 91 in Fig. 15 preferably have a reactance when current flows in only one of the two windings equal to about one-third that of the secondary or loop circuit mains between the points of connection thereto of the pairs of feeder circuits. With such a value of impedance the impedance offered by the reactors to circulating currents is approximately one and one-third times the impedance of the secondary or loop circuit mains between the points of connection of the conductors 96. Although other values of reactance could be employed, the value herein specified assures a substantially even distribution of load among the operative network transformers when one of the feeder circuits is out of service. The units shown in Fig. 15 generally will have a width equal to one city block and may have a length equal to $$\left(\frac{x}{2}-1\right)$$

times the width where $x$ is any number evenly divisible by both 2 and 3.

Figure 16:
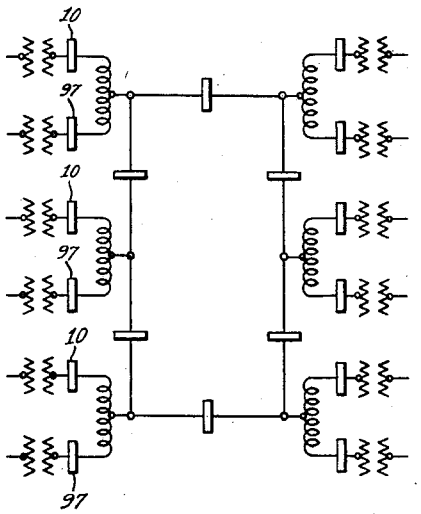

Fig. 16 is substantially similar to Fig. 15, but in Fig. 16 the auxiliary switches 97 have been moved up to replace half of the network switches 10. As above explained, when the auxiliary switch 97 is employed as illustrated in Fig. 16, a transfer relay is not employed therefor. In Fig. 16, the auxiliary switch 97 recloses only when voltage is present on the transformer side thereof.

With the loop circuits herein described, it is possible to connect in parallel to the loop circuits radial loads or additional loop or secondary network circuits for energization from the same feeder circuits.

Circuits such as those illustrated in Fig. 13 also have the advantage that in starting up a completely dead network distribution system, the network switches on all except one loop circuit may be blocked open and loop circuits may be added to the system as the system becomes able to supply the increased load.

Furthermore, any loop circuit may be serviced or modified without impairing service to the remaining loop circuits. This may be accomplished merely by blocking open the network switches associated with the loop circuit to be removed from service.

Figure 17:
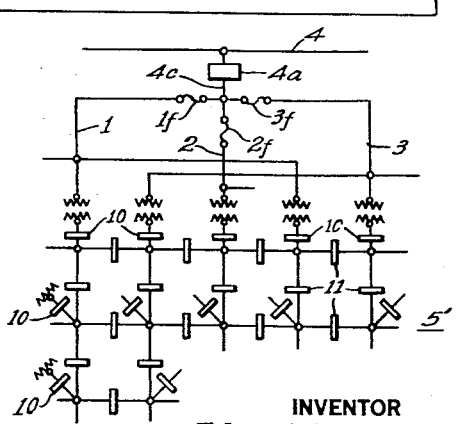
Fig. 17 is a single line diagrammatic view of a modified network distribution system embodying the invention.

Fig. 17 illustrates a secondary network distribution circuit 5' of the solid grid type somewhat similar to that illustrated in Fig. 1. In Fig. 17, however, the network switches 10 and the sectionalizing switches 11 are employed in place of the Palmer type protectors 6 of Fig. 1. Fig. 17 also shows a modified system for energizing the feeder circuits.

In the systems thus far described, the feeder circuits 1, 2 and 3 are energized directly from a bus 4 or from separate sources. If only a single radial main feeder circuit 4c is available, the feeder circuits 1, 2 and 3 may be energized therefrom through suitable fuses 1f, 2f and 3f. The single radial main feeder circuit 4c is energized from the bus 4 through a main circuit breaker 4a. Preferably this circuit breaker is provided with a time delay in tripping which is longer than that of the fuses 1f, 2f and 3f. Consequently, if a fault occurs on one of the feeder circuits 1, 2, or 3, the associated fuse opens before the circuit breaker 4a can trip. The remaining feeder circuits continue to supply energy to their secondary network.

Certain subject matter herein disclosed is disclosed and claimed in my copending applications Serial Nos. 342,939 and 342,940, filed concurrently herewith.

Although I have described my invention with reference to certain specific embodiments thereof, I do not desire the invention to be restricted except as required by the appended claims when interpreted in view of the prior art.

I claim as my invention:

1. In an electrical distribution system a plurality of substantially independent secondary loop circuits, and a plurality of primary feeder circuits for supplying electrical energy to said secondary loop circuits, each of said primary feeder circuits being operatively connected to each of said loop circuits at a plurality of points, and said loop circuits being electrically connected to each other only through said primary feeder circuits.

2. In an electrical distribution system, a plurality of substantially independent, secondary loop circuits for distributing electrical energy at a predetermined voltage, a plurality of primary feeder circuits for supplying electrical energy to said secondary loop circuits at a voltage higher than said predetermined voltage, and a plurality of electrical transformers for operatively connecting said feeder circuits to said loop circuits, each of said feeder circuits having a plurality of said electrical transformers for each of said loop circuits, and said loop circuits being electrically connected to each other only through said electrical transformers and said feeder circuits.

3. In an electrical distribution system, a secondary loop circuit for distributing electrical energy, a plurality of primary feeder circuits for supplying electrical energy to said loop circuit, and a plurality of transformers for each of said feeder circuits for operatively connecting said feeder circuits to said loop circuit, the secondary windings of said transformers being connected only through said loop circuit, and said loop circuit being electrically connected to said feeder circuits for energization only through said network transformers.

4. In an electrical distribution system for supplying loads positioned adjacent city streets, a first loop circuit having legs extending along certain of said city streets, a second loop circuit independent of said first loop circuit and having legs extending along certain of said city streets, a first group of transformers having secondary windings operatively connected only to said first loop circuit, a second group of transformers having secondary windings operatively connected only to said second loop circuit, a plurality of feeder circuits, each of said feeder circuits being operatively connected to the primary windings of a separate portion only of said first group of transformers and a separate portion only of said second group of transformers, and said loop circuits being electrically connected only through said feeder circuits.

5. In a distribution system, a secondary loop circuit, a plurality of groups of network transformers having their secondary windings operatively connected directly to said loop circuit, said groups being spaced successively about said loop circuit, and a plurality of primary feeder circuits, each of said primary feeder circuits being operatively connected for energizing a corresponding separate one of the network transformers in each of said groups, and said loop circuit being electrically connected to said feeder circuits for energization only through said network transformers.

6. In an electrical distribution system, a secondary distribution loop circuit, a plurality of network transformers having secondary windings operatively connected directly to said loop circuit, and a plurality of feeder circuits operatively connected to separate groups of said network transformers for supplying electrical energy therethrough to said loop circuit, said network transformers being so disposed relative to said feeder circuits and to said loop circuit that when one of said feeder circuits is inoperative the electrical energy supplied to said loop circuit is divided substantially uniformly among the network transformers associated with the remainder of said feeder circuits, and said loop circuit being connected to said feeder circuits for energization only through said network transformers.

7. In an electrical distribution system, a secondary network system comprising a plurality of substantially independent loop circuits, a plurality of groups of network transformers for each of said loop circuits, and a plurality of feeder circuits for supplying electrical energy through said network transformers to said loop circuits, each of said feeder circuits being operatively connected to a separate one of the network transformers in each of said groups, said network transformers being so disposed relative to said loop circuits and to said feeder circuits that when one of said feeder circuits is inoperative the electrical energy supplied to said loop circuits divides uniformly among the network transformers associated with the remainder of said feeder circuits, said loop circuits being electrically connected only through said feeder circuits.

8. In an electrical distribution system, a secondary distribution loop circuit, a plurality of network transformers having secondary windings operatively connected directly to said loop circuit, and a plurality of feeder circuits operatively connected to separate groups of said network transformers for supplying electrical energy therethrough to said loop circuit, said network transformers being so disposed relative to said feeder circuits and to said loop circuit that the impedance of said loop circuit between any pair of adjacent network transformers has substantially a common value, and said loop circuit being electrically connected to said feeder circuits for energization only through said network transformers.

9. In an electrical distribution system, a secondary network system comprising a plurality of substantially independent loop circuits, a plurality of groups of network transformers for each of said loop circuits, and a plurality of feeder circuits for supplying electrical energy through said network transformers to said loop circuits, each of said feeder circuits being operatively connected to a separate one of the network transformers in each of said groups, said network transformers being so disposed relative to said loop circuits and to said feeder circuits that the impedance of the portion of said loop circuits between any pair of adjacent network transformers has substantially a common value, and said loop circuits being electrically connected only through said feeder circuits.

10. In a distribution system, a secondary loop circuit, a plurality of groups of network transformers having their secondary windings operatively connected directly to said loop circuit, said groups being spaced successively about said loop circuit, and a plurality of primary feeder circuits, each of said primary feeder circuits being operatively connected for energizing a corresponding separate one of the network transformers in each of said groups, the impedance of said loop circuit between any pair of adjacent network transformers having a substantially constant value, and said loop circuit being electrically connected to said feeder circuits for energization only through said network transformers.

11. In an electrical distribution system, a secondary loop circuit, a plurality of network transformers for supplying energy to said loop circuit, said network transformers being operatively connected to said loop circuit at points substantially uniformly distributed about said loop circuit, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, said loop circuit being electrically connected to said feeder circuits for energization only through said network transformers.

12. In an electrical distribution system a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, said loop circuit being electrically connected to said feeder circuits for energization only through said network transformers.

13. In an electrical distribution system, a plurality of substantially independent secondary loop circuits for distributing electrical energy at a predetermined voltage, a plurality of primary feeder circuits for supplying electrical energy to said secondary loop circuits at a voltage higher than said predetermined voltage, a plurality of electrical transformers for operatively connecting said feeder circuits to said loop circuits, each of said feeder circuits having a plurality of said electrical transformers for each of said loop circuits, said loop circuits being electrically connected only through said feeder circuits, and a plurality of switches for controlling the connection of said feeder circuits through said transformers to said loop circuits, one of said switches being provided for each of said transformers.

14. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, said loop circuit being electrically connected to said feeder circuits for energization only through said transformers, a plurality of switches for controlling the connection of said feeder circuit through said transformers to said loop circuit, one of said switches being provided for each of said transformers, and means responsive to the condition of one of said feeder circuits for tripping the switches associated with said feeder circuit.

15. In an electrical distribution system, a secondary loop circuit, a plurality of feeder circuits for energizing said loop circuit, energy source means for said feeder circuits, a switch for operatively connecting each of said feeder circuits to said loop circuit, means responsive to the condition of said distribution system when a fault occurs on one of said feeder circuits for sectionalizing said loop circuit adjacent said one feeder circuit to disconnect said one feeder circuit from portions of the loop circuit associated with the remaining feeder circuits, means for disconnecting said one feeder circuit from its source means, and means responsive to a deenergized condition of said one feeder circuit for opening the switch associated therewith.

16. In an electrical distribution system, a secondary loop circuit, a plurality of feeder circuits for energizing said loop circuit, energy source means for said feeder circuits, a switch for operatively connecting each of said feeder circuits to said loop circuit, means responsive to the condition of said distribution system when a fault occurs on one of said feeder circuits for sectionalizing said loop circuit adjacent said one feeder circuit to disconnect said one feeder circuit from portions of the loop circuit associated with the remaining feeder circuits, means for disconnecting said one feeder circuit from its source means, means responsive to a deenergized condition of said one feeder circuit for opening the switch associated therewith, and means for restoring said loop circuit to its original condition after an operation of said sectionalizing means.

17. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, and means effective only when an electrical quantity at one of said circuit breakers is below a predetermined value for tripping said one circuit breaker.

18. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means effective only when an electrical quantity at one of said circuit breakers is below a predetermined value for tripping said one circuit breaker, and means effective after a time delay for restoring said secondary distribution circuit to its original condition following an operation of said sectionalizing means.

19. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means effective only when an electrical quantity at one of said circuit breakers is below a predetermined value for tripping said one circuit breaker, means effective after a time delay for restoring said secondary distribution circuit to its original condition following an operation of said sectionalizing means, and means effective after a number of immediately successive operations of said sectionalizing means and restoring means for preventing further operation of said restoring means.

20. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means effective only when an electrical quantity at one of said circuit breakers is below a predetermined value for tripping said one circuit breaker, and means effective after a time delay for restoring said secondary distribution circuit to its original condition following an operation of said sectionalizing means, said restoring means being responsive to the presence of voltage in said secondary distribution circuit on either side of said interruption in the connections thereof.

21. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means effective only when an electrical quantity at one of said circuit breakers is below a predetermined value for tripping said one circuit breaker, and means for reclosing said one circuit breaker responsive to the voltage of its associated feeder circuit.

22. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means for reclosing said one circuit breaker responsive to the voltage of its associated feeder circuit, and means for rendering said reclosing means ineffective in response to incorrect phase conditions across the terminals of said one circuit breaker.

23. In an electrical distribution system, a secondary distribution circuit, a plurality of primary feeder circuits for energizing said secondary distribution circuit, a plurality of transformers for coupling said primary feeder circuits to said secondary distribution circuit, a plurality of circuit breakers for controlling the connections of said transformers between said feeder circuits and said distribution circuit, each of said transformers being connected between one of said feeder circuits and said distribution circuit through a separate one of said circuit breakers, and each of said primary feeder circuits having a separate group of said transformers, sectionalizing means effective upon the occurrence of a fault on one of said feeder circuits for interrupting the connections through said secondary distribution circuit of the circuit breakers associated with said faulty feeder circuit to the remainder of said circuit breakers, means for reclosing said one circuit breaker responsive to the voltage of its associated feeder circuit, and means effective after a time delay for restoring said secondary distribution circuit to its original condition following an operation of said sectionalizing means, said restoring means being responsive to the presence of voltage in said secondary distribution circuit on either side of said interruption in the connections thereof.

24. In an electrical distribution system, a secondary distribution circuit, a plurality of primary feeder circuits for energizing said secondary distribution circuit, a plurality of transformers for coupling said primary feeder circuits to said secondary distribution circuit, and means for interrupting the electrical connection of one of said primary feeder circuits to the remainder of said primary feeder circuits comprising a plurality of sectionalizing circuit breakers for controlling the connections between portions of said secondary distribution circuit, only one of said sectionalizing circuit breakers being located in each secondary distribution circuit connection between each transformer assocated with said one primary feeder circuit and each of the nearest transformers associated with the remainder of said primary feeder circuits.

25. In a distribution system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers between their associated feeder circuits and said loop circuit, and means effective only when current flowing through one of said switches is below a predetermined value for tripping said one switch, said loop circuit being connected to said feeder circuits for energization only through said network transformers.

26. In an electrical distribution system a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, a plurality of switches for controlling the connection of said transformers to said loop circuit, means effective only when the resultant of the voltage available at one of said switches and the current flowing therethrough is below a predetermined value for tripping said one switch, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, said loop circuit being connected to said feeder circuits for energization only through said network transformers.

27. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers between their associated feeder circuits and said loop circuit, one of said switches being provided for each of said transformers, means responsive to the condition of one of said feeder circuits for tripping the switches associated with said feeder circuit, and means effective after a predetermined time delay for reclosing said switches, said loop circuit being connected to said feeder circuits for energization only through said transformers.

28. In a distribution system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers between their associated feeder circuits and said loop circuit, means effective only when current flowing through one of said switches is below a predetermined value for tripping said one switch, and means responsive to the voltage of said feeder circuit and effective after a predetermined time delay for reclosing said one switch, said loop circuit being connected to said feeder circuits for energization only through said network transformers.

29. In an electrical distribution system a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, a plurality of switches for controlling the connection of said transformers to said loop circuit, means effective only when the resultant of the voltage available at any one of said switches and the current flowing therethrough is below a predetermined value for tripping said one switch, means responsive to the voltage available at said one switch and effective after a first predetermined time for reclosing said one switch, said last-named means being adjusted to reset after an operation thereof within a second predetermined time, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, and a reclosing feeder circuit breaker for each of said feeder circuits, said feeder circuit breaker having a longer time delay between successive reclosures than said second predetermined time, said loop circuit being connected to said feeder circuits for energization only through said network transformers.

30. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, and sectionalizing means for sectionalizing said loop circuit, said loop circuit being electrically connected to said feeder circuits for energization only through said transformers.

31. In a distribution system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, and sectionalizing means responsive to current flowing in said loop circuit for sectionalizing said loop circuit after a predetermined time delay, said loop circuit being electrically connected to said feeder circuits for energization only through said network transformers.

32. In an electrical distribution system, a secondary distribution loop circuit, a plurality of network transformers having secondary windings operatively connected directly to said loop circuit, a plurality of feeder circuits operatively connected to separate groups of said network transformers for supplying electrical energy therethrough to said loop circuit, said network transformers being so disposed relative to said feeder circuits and to said loop circuit that when one of said feeder circuits is inoperative the electrical energy supplied to said loop circuit is divided substantially uniformly among the network transformers associated with the remainder of said feeder circuits, and sectionalizing means for sectionalizing said loop circuit, said loop circuit being connected to said feeder circuits for energization only through said network transformers.

33. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, sectionalizing means for sectionalizing said loop circuit, and restoring means effective after a predetermined time for restoring said loop circuit to its original condition after an operation of said sectionalizing means, said loop circuit being connected to said feeder circuits for energization only through said transformers.

34. In an electrical distribution system, a secondary distribution loop circuit, a plurality of network transformers having secondary windings operatively connected directly to said loop circuit, a plurality of feeder circuits operatively connected to separate groups of said network transformers for supplying electrical energy therethrough to said loop circuit, said network transformers being so disposed relative to said feeder circuits and to said loop circuit that when one of said feeder circuits is inoperative the electrical energy supplied to said loop circuit is divided substantially uniformly among the network transformers associated with the remainder of said feeder circuits, sectionalizing means responsive to current flowing in said loop circuit for sectionalizing said loop circuit, and restoring means effective after a predetermined time for restoring said loop circuit to its original condition after an operation of said sectionalizing means, said loop circuit being connected to said feeder circuits for energization only through said network transformers.

35. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, sectionalizing means for sectionalizing said loop circuit, and restoring means effective after a predetermined time for restoring said loop circuit to its original condition after an operation of said sectionalizing means, said restoring means being responsive to voltage above a predetermined value present in said loop circuit on either side of said sectionalizing means.

36. In an electrical distribution system, a secondary distribution loop circuit, a plurality of network transformers having secondary windings operatively connected to said loop circuit, a plurality of feeder circuits operatively connected to separate groups of said network transformers for supplying electrical energy therethrough to said loop circuit, said network transformers being so disposed relative to said feeder circuits and to said loop circuit that when one of said feeder circuits is inoperative the electrical energy supplied to said loop circuit is divided substantially uniformly among the network transformers associated with the remainder of said feeder circuits, sectionalizing means responsive to a predetermined magnitude of current flowing in said loop circuit for a predetermined time for sectionalizing said loop circuit, and restoring means effective after a predetermined time in response to voltage above a predetermined value present in said loop circuit on either side of said sectionalizing means for restoring said loop circuit to its original condition after an operation of said sectionalizing means.

37. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers between said feeder circuits and said loop circuit, one of said switches being provided for each of said transformers, sectionalizing means for substantially isolating said switches electrically from each other, and means responsive to the condition of one of said feeder circuits for tripping the switches associated with said feeder circuit, said loop circuit being connected to said feeder circuits for energization only through said transformers.

38. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers between said feeder circuits and said loop circuit, one of said switches being provided for each of said transformers, sectionalizing means responsive to current flowing in said loop circuit for sectionalizing said loop circuit between adjacent points of connection thereto of said transformers, and means responsive to the condition of one of said feeder circuits for tripping the switches associated with said feeder circuit, said loop circuit being connected to said feeder circuits for energization only through said transformers.

39. In a distributing system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers between said feeder circuits and said loop circuit, sectionalizing means for substantially isolating said switches electrically from each other, and means effective only when current flowing through one of said switches is below a predetermined value for tripping said one switch, said loop circuit being connected to said feeder circuits for energization only through said network transformers.

40. In a distribution system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers between said feeder circuits and said loop circuit, sectionalizing means responsive to current flowing in said loop circuit for sectionalizing said loop circuit between adjacent points of connection thereto of said transformers, and means effective only when current flowing through any one of said switches is below a predetermined value for tripping said one switch, said loop circuit being connected to said feeder circuits for energization only through said network transformers.

41. In an electrical distribution system, a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, a plurality of switches for controlling the connection of said transformers to said loop circuit, sectionalizing means for substantially isolating said switches electrically from each other, means effective only when the resultant of the voltage available at one of said switches and the current flowing therethrough is below a predetermined value for tripping said one switch, and a plurality of feeder circuits for energizing said network transformers, each of said feeder circuits being connected to a group of said network transformers wherein adjacent network transformers of the group are separated by additional units of said network transformers equal in number to one less than the number of said feeder circuits.

42. In an electrical distribution system, a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, sectionalizing means responsive to current flowing in said loop circuit for sectionalizing said loop circuit between adjacent points of connection thereto of said transformers, a plurality of switches for controlling the connection of said transformers to said loop circuit, means effective only when the resultant of the voltage available at one of said switches and the current flowing therethrough is below a predetermined value for tripping said one switch, and a plurality of feeder circuits for energizing said network transformers, each of said feeder circuits being connected to a group of said network transformers wherein adjacent network transformers of the group are separated by additional units of said network transformers equal in number to one less than the number of said feeder circuits.

43. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits of said loop circuit, the secondary windings of said transformers being connected only through said loop circuit, a plurality of switches for controlling the connection of said transformers to said loop circuit, one of said switches being provided for each of said transformers, sectionalizing means for substantially isolating said switches electrically from each other, means responsive to the condition of one of said feeder circuits for tripping the switches associated with said feeder circuit, and means effective after a predetermined time delay for reclosing said switches.

44. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, sectionalizing means responsive to current flowing in said loop circuit for sectionalizing said loop circuit between adjacent points of connection thereto of said transformers, a plurality of switches for controlling the connection of said transformers between said feeder circuits and said loop circuit, one of said switches being provided for each of said transformers, means responsive to the condition of one of said feeder circuits for tripping the switches associated with said one feeder circuit, and means effective after a predetermined time delay for reclosing said switches, said loop circuit being connected to said feeder circuit for energization only through said transformers.

45. In a distribution system, a secondary loop circuit, a plurality of groups of network transformers having their secondary windings operatively connected directly to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers between said feeder circuits and said loop circuit, sectionalizing means for substantially isolating said switches electrically from each other, means effective only when current flowing through one of said switches is below a predetermined value for tripping said one switch, and means responsive to the voltage of the feeder circuit associated with said one switch and effective after a predetermined time delay for reclosing said one switch, said loop circuit being connected to said feeder circuits for energization only through said network transformers.

46. In a distribution system, a secondary loop circuit, a plurality of groups of network transformers having their secondary windings operatively connected to said loop circuit, said groups being spaced successively about said loop circuit, a plurality of primary feeder circuits, each of said primary feeder circuits being operatively connected for energizing a corresponding separate one of the network transformers in each of said groups, sectionalizing means responsive to current flowing in said loop circuit for sectionalizing said loop circuit between adjacent points of connection thereto of said transformers, a plurality of switches for controlling the connection of said transformers to said loop circuit, means effective only when current flowing through one of said switches is below a predetermined value for tripping said one switch, and means responsive to the voltage of the feeder circuit associated with said one switch and effective after a predetermined time delay for reclosing said one switch.

47. In an electrical distribution system a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, a plurality of switches for controlling the connection of said transformers to said loop circuit, means effective only when the resultant of the voltage available at any one of said switches and the current flowing therethrough is below a predetermined value for tripping said one switch, means responsive to the voltage available at said one switch and effective after a first predetermined time for reclosing said one switch, said last-named means being adjusted to reset after an operation thereof within a second predetermined time, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, a reclosing feeder circuit breaker for each of said feeder circuits, said feeder circuit breakers having a longer time delay between successive reclosures than said second predetermined time, and sectionalizing means for substantially isolating said switches electrically from each other.

48. In an electrical distribution system a secondary loop circuit, a plurality of network transformers for supplying energy to said loop circuit, said network transformers being operatively connected to said loop circuit at points substantially uniformly distributed about said loop circuit, the impedance of said loop circuit between any pair of adjacent points having a substantially common value, a plurality of switches for controlling the connection of said transformers to said loop circuit, means effective only when the resultant of the voltage available at one of said switches and the current flowing therethrough is below a predetermined value for tripping said one switch, means responsive to the voltage available at said one switch effective after a first predetermined time for reclosing said one switch, said last-named means being adjusted to reset after any operation thereof within a second predetermined time, and a plurality of feeder circuits for energizing said network transformers, each of said feeder circuits being connected to a group of said network transformers wherein adjacent network transformers of the group are separated by additional units of said network transformers equal in number to one less than the number of said feeder circuits, a reclosing feeder circuit breaker for each of said feeder circuits, said feeder circuit breakers having a longer time delay between successive reclosure than said second predetermined time, and sectionalizing means responsive to current flowing in said loop circuit for sectionalizing said loop circuit between adjacent points of connection thereto of said transformers.

49. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers to said loop circuit, one of said switches being provided for each of said transformers, sectionalizing means for substantially isolating said switches electrically from each other, means responsive to the condition of one of said feeder circuits for tripping the switches associated with said one feeder circuit, and means for reclosing said sectionalizing means.

50. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers to said loop circuit, one of said switches being provided for each of said transformers, sectionalizing means responsive to current flowing in said loop circuit for sectionalizing said loop circuit between adjacent points of connection thereto of said transformers, means responsive to the condition of one of said feeder circuits for tripping the switches associated with said one feeder circuit, and restoring means responsive to voltage present in said loop circuit on either side of said sectionalizing means for restoring said loop circuit to its original condition after an operation of said sectionalizing means.

51. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers to said loop circuit, one of said switches being provided for each of said transformers, sectionalizing means responsive to current flowing in said loop circuit for sectionalizing said loop circuit between adjacent points of connection thereto of said transformers, means responsive to the condition of one of said feeder circuits for tripping the switches associated with said one feeder circuit, and restoring means responsive to voltage present in said loop circuit on either side of said sectionalizing means for restoring said loop circuit to its original condition after an operation of said sectionalizing means, said restoring means being effective only after a predetermined time delay.

52. In a distribution system, a secondary loop circuit, a plurality of groups of network transformers having their secondary windings operatively connected to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers to said loop circuit, means effective only when current flowing through any one of said switches is below a predetermined value for tripping said one switch, sectionalizing means responsive to current flowing in said loop circuit for sectionalizing said loop circuit between adjacent points of connection thereto of said transformers, and restoring means responsive to voltage present in said loop circuit on either side of said sectionalizing means for restoring said loop circuit to its original condition after an operation of said sectionalizing means.

53. In an electrical distribution system, a secondary loop circuit for distributing electrical energy, a plurality of primary feeder circuits for supplying electrical energy to said loop circuit, a plurality of transformer for each of said feeder circuits for operatively connecting said feeder circuits to said loop circuit, the secondary windings of said transformers being connected only through said loop circuit, a plurality of switches for controlling the connection of said transformers to said loop circuit, one of said switches being provided for each of said transformers, sectionalizing means responsive to current flowing in said loop circuit for sectionalizing said loop circuit between adjacent points of connection thereto of said transformers, means responsive to the condition of one of said feeder circuits for tripping the switches associated with said one feeder circuit, means effective after a predetermined time delay for reclosing said switches, and restoring means responsive to voltage present in said loop circuit on either side of said sectionalizing means for restoring said loop circuit to its original condition after an operation of said sectionalizing means.

54. In a distribution system, a secondary loop circuit, a plurality of groups of network transformers having their secondary windings operatively connected to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers to said loop circuit, means effective only when current flowing through any one of said switches is below a predetermined value for tripping said one switch, means responsive to the voltage of said feeder circuit and effective after a predetermined time delay for reclosing said one switch, sectionalizing means responsive to current flowing in said loop circuit for sectionalizing said loop circuit between adjacent points of connection thereto of said transformers, and restoring means responsive to voltage present in said loop circuit on either side of said sectionalizing means for restoring said loop circuit to its original condition after an operation of said sectionalizing means.

55. In a network distribution system, a secondary distribution circuit, a plurality of feeder circuits for supplying electrical energy to said distribution circuit, a plurality of transformers for operatively connecting each of said feeder circuits to said secondary distribution circuit, a network switch for operatively connecting each of said transformers to said distribution circuit, means for opening each of said switches only when current below a predetermined value flows therethrough, and means responsive to the condition of a feeder circuit when a fault occurs thereon for substantially deenergizing the network switches associated only with the faulted feeder circuit.

56. In a network distribution system, a secondary distribution circuit, a plurality of feeder circuits for supplying electrical energy to said distribution circuit, a plurality of enclosed liquid-insulated transformers for operatively connecting each of said feeder circuits to said secondary distribution circuit, a network switch for operatively connecting each of said transformers to said distribution circuit, each of said network switches being immersed in the liquid of its associated transformer, means for opening each of said switches only when current below a predetermined value flows therethrough, and means responsive to the condition of a feeder circuit when a fault occurs thereon for substantially deenergizing the network switches associated only with the faulted feeder circuit.

57. In an electrical network distribution system, a secondary distribution circuit, a plurality of feeder circuits for energizing said secondary distribution circuit, a plurality of transformers for operatively connecting each of said feeder circuits to said distribution circuit, switching means for substantially isolating one of said feeder circuits and its associated transformers electrically when a fault occurs on said one feeder circuit, said switching means including a plurality of switches for connecting said transformers to said distribution circuit, and means for tripping said switches only when current therethrough is below a predetermined value, and fuses in the primary circuit of each of the transformers associated with said one feeder circuit, said fuses being proportioned to open the circuit of its associated transformer on an internal transformer fault passing a current in excess of rated load current but too small for actuating said switching means, and said fuses having time delay sufficient for permitting prior actuation of said switching means on feeder circuit faults.

58. In an electrical distribution system, a secondary loop circuit for distributing electrical energy, a plurality of primary feeder circuits for supplying electrical energy to said loop circuit, a plurality of transformers for each of said feeder circuits for operatively connecting said feeder circuits to said loop circuit, the secondary windings of said transformers being connected only through said loop circuit, a plurality of switches for controlling the connection of said transformers between said feeder circuits and said loop circuit, one of said switches being provided for each of said transformers, means responsive to the condition of one of said feeder circuits for tripping the switches associated with said one feeder circuit, means effective after a predetermined time delay for reclosing said switches, and means for preventing reclosure of any one of said switches if phase conditions across the terminals of said one switch are incorrect.

59. In a distribution system, a secondary loop circuit, a plurality of groups of network transformers having their secondary windings operatively connected to said loop circuit, said groups being spaced successively about said loop circuit, a plurality of primary feeder circuits, each of said primary feeder circuits being operatively connected for energizing a corresponding separate one of the network transformers in each of said groups, a plurality of switches for controlling the connection of said transformers to said loop circuit, means effective only when current flowing through any one of said switches is below a predetermined value for tripping said one switch, means responsive to the voltage of the feeder circuit associated with said one switch and effective after a predetermined time delay for reclosing said one switch, sectionalizing means responsive to current flowing in said loop circuit for sectionalizing said loop circuit between adjacent points of connection thereto of said transformers, and means for preventing reclosure of any one of said switches if the phase conditions across the terminals of said one switch are incorrect.

60. In an electrical network distribution system, a secondary distribution circuit, a pair of feeder circuits for supplying energy to said distribution circuit, and a plurality of pairs of transformers for operatively connecting said feeder circuits to said distribution circuit, each transformer in each of said pairs of transformers having its primary winding connected to a separate one of said feeder circuits, and each of said pairs of transformers having secondary windings connected in parallel for supplying electrical energy to said distribution circuit at a common point.

61. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon, and a plurality of feeder circuits for energizing said transformers, a first one of said feeder circuits being connected to one transformer of each of said pairs of transformers, and a second one of said feeder circuits being connected to the remaining transformer of each of said pairs of transformers, said loop circuit being connected to said feeder circuits for energization only through said transformers.

62. In an electrical network distribution system, a secondary distribution loop circuit, a plurality of groups of transformers substantially uniformly spaced about said loop circuit, each of said groups of transformers including a plurality of pairs of transformers, each of said pairs of transformers having secondary windings connected in parallel for supplying electrical energy to said loop circuit at a common point, and a plurality of feeder circuits for supplying electrical energy to said loop circuit through said transformers, each of said feeder circuits being operatively connected to a corresponding separate transformer in each of said group of transformers, and the impedance of said loop circuit between any adjacent pair of said common points having substantially the same value, said loop circuit being connected to said feeder circuits for energization only through said transformers.

63. In an electrical network distribution system, a secondary distribution circuit, a pair of feeder circuits for supplying energy to said distribution circuit, a plurality of pairs of transformers for operatively connecting said feeder circuits to said distribution circuit, each transformer in each of said pairs of transformers having its primary winding connected to a separate one of said feeder circuits, and each of said pairs of transformers having secondary windings connected in parallel for supplying electrical energy to said distribution circuit at a common point, and means associated with said transformers for offering a substantially higher impedance to the interchange of current between the transformers of one of said pairs than to the supply of current from said transformers to said distribution circuit.

64. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon, a plurality of feeder circuits for energizing said transformers, a first one of said feeder circuits being connected to one transformer of each of said pairs of transformers, and a second feeder circuit being connected to the remaining transformer of each of said pairs of transformers, and means associated with said transformers for offering a substantially higher impedance to the interchange of current between the transformers of one of said pairs than to the supply of current from said transformers to said loop circuit, said loop circuit being electrically connected to said feeder circuits for energization only through said transformers.

65. In an electrical network distribution system, a secondary distribution circuit, a pair of feeder circuits for supplying energy to said distribution circuit, a plurality of pairs of transformers for operatively connecting said feeder circuits to said distribution circuit, each transformer in each of said pairs of transformers having its primary winding connected to a separate one of said feeder circuits, each of said pairs of transformers having secondary windings connected in parallel for supplying electrical energy to said distribution circuit at a common point, and means associated with said transformers for dividing the load on said distribution circuit uniformly among the remaining energized transformers when one of said feeder circuits is inoperative.

66. In an electrical network distribution system, a secondary distribution circuit, a plurality of groups of transformers substantially uniformly spaced about said circuit, each of said groups of transformers including a plurality of pairs of transformers, each of said pairs of transformers having secondary windings connected in parallel for supplying electrical energy to said circuit at a common point, a plurality of feeder circuits for supplying electrical energy to said circuit through said transformers, each of said feeder circuits being operatively connected to a corresponding separate transformer in each of said group of transformers, and regulating means associated with said transformers for offering a substantially higher impedance to the interchange of current between the transformers of one of said pairs than to the supply of current from said transformers to said circuit, said regulating means including means for dividing the load on said circuit substantially uniformly among the remaining energized transformers when one of said feeder circuits is inoperative.

67. In an electrical network distribution system, a secondary distribution circuit, a pair of feeder circuits for supplying energy to said distribution circuit, a plurality of pairs of transformers for operatively connecting said feeder circuits to said distribution circuit, each transformer in each of said pairs of transformers having its primary winding connected to a separate one of said feeder circuits, each of said pairs of transformers having secondary windings connected in parallel for supplying electrical energy to said distribution circuit at a common point, and means for interrupting the parallel connection of the secondary windings of said one pair of transformers.

68. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon, a plurality of feeder circuits for energizing said transformers, a first one of said feeder circuits being connected to one transformer of each of said pairs of transformers, and a second feeder circuit being connected to the remaining transformer of each of said pairs of transformers, and means effective upon the occurrence of a fault on one of said feeder circuits for interrupting the parallel connections of said transformer secondary windings after a predetermined time delay.

69. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon, a plurality of feeder circuits for energizing said transformers, a first one of said feeder circuits being connected to one transformer of each of said pairs of transformers, and a second one of said feeder circuits being connected to the remaining transformer of each of said pairs of transformers, switching means operable for disconnecting each of said transformers from said loop circuit, means effective upon the occurrence of a fault on said first one of said feeder circuits for sectionalizing said loop circuit to prevent the flow of current from said loop circuit to said fault, interrupting means for interrupting the circulating current supplied from said second feeder circuit to said first feeder circuit through said parallel-connected secondary windings, and means effective only when current below a predetermined value flows through their switching means for disconnecting the transformers associated with said first one of said feeder circuits from said loop circuit.

70. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon; a plurality of feeder circuits for energizing said transformers, a first one of said feeder circuits being connected to one transformer of each of said pairs of transformers, and a second one of said feeder circuits being connected to the remaining transformer of each of said pairs of transformers; switching means operable for disconnecting each of said transformers from said loop circuit; means effective upon the occurrence of a fault on said first one of said feeder circuits for sectionalizing said loop circuit to prevent the flow of current from said loop circuit to said fault after a time delay sufficient to permit usual loop circuit faults to burn clear; interrupting means for interrupting the circulating current supplied from said second feeder circuit to said first feeder circuit through said parallel-connected secondary windings, after a predetermined time delay, and means effective when substantially no current flows through their switching means for disconnecting the transformers associated with said first one of said feeder circuits from said loop circuit.

71. In an electrical network distribution system, a secondary distribution loop circuit, a plurality of pairs of transformers, each of said pairs of transformers having secondary windings connected in parallel to a common point on said loop circuit for supplying electrical energy thereto, said pairs of transformers being spaced about said loop for supplying energy thereto at spaced points thereon, a plurality of feeder circuits for energizing said transformers, a first one of said feeder circuits being connected to one transformer of each of said pairs of transformers, and a second feeder circuit being connected to the remaining transformer of each of said pairs of transformers, switching means operable for disconnecting each of said transformers from said loop circuit, means effective upon the occurrence of a fault on said first one of said feeder circuits for sectionalizing said loop circuit to prevent the flow of current from said loop circuit to said fault, interrupting means for interrupting the circulating current supplied from said second feeder circuit to said first feeder circuit through said parallel-connected secondary windings, means effective when substantially no current flows through said switching means for disconnecting the transformers associated with said first one of said feeder circuits from said loop circuit, means responsive after a predetermined time delay to voltage present on said loop circuit on either side of said sectionalizing means for restoring said loop circuit to its initial condition, and voltage responsive means for reclosing said interrupting means.

72. In an electrical network distribution system, a secondary distribution circuit, a pair of feeder circuits for supplying energy to said distribution circuit, a plurality of pairs of transformers for operatively connecting said feeder circuits to said distribution circuit, each transformer in each of said pairs of transformers having its primary winding connected to a separate one of said feeder circuits, and each of said pairs of transformers having secondary windings connected in parallel for supplying electrical energy to said distribution circuit at a common point, and means associated with said transformers for offering a substantially higher impedance to the interchange of current between the transformers of one of said pairs than to the supply of current from said transformers to said distribution circuit, said last-named means including a reactor having a separate winding energized from each transformer of said one pair, said windings being so energized that under normal conditions of energy supply from both transformers of said one pair to said distribution circuit the magneto-motive forces of said windings are in opposition.

73. In an electrical network distribution system, a secondary distribution circuit, a pair of feeder circuits for supplying energy to said distribution circuit, a plurality of pairs of transformers for operatively connecting said feeder circuits to said distribution circuit, each transformer in each of said pairs of transformers having its primary winding connected to a separate one of said feeder circuits, and each of said pairs of transformers having secondary windings connected in parallel for supplying electrical energy to said distribution circuit at a common point, and means associated with said transformers for offering a substantially higher impedance to the interchange of current between the transformers of one of said pairs than to the supply of current from said transformers to said distribution circuit, said last-named means including a reactor having a separate winding energized from each transformer of said one pair, said windings being so energized that under normal conditions of energy supply from both transformers of said one pair to said distribution circuit the magnetomotive forces of said windings are in opposition, whereby said reactor offers substantially no impedance to the flow of current therethrough under normal conditions of operation, and said windings being so disposed that when energized by current interchanged between the transformers of said one pair, their magnetomotive forces add to offer substantial impedance to the flow of said interchanged current.

74. In an electrical distribution system, a secondary distribution circuit, a plurality of pairs of feeder circuits for supplying energy to said secondary distribution circuit, means for connecting each of said pairs of feeder circuits in parallel for supplying energy to spaced points on said secondary distribution circuit, and means for preventing the interchange of substantial energy between the feeder circuits of each of said pairs.

75. In an electrical distribution system, a secondary distribution circuit, a plurality of pairs of feeder circuits for supplying energy to said secondary distribution circuit, means for connecting each of said pairs of feeder circuits in parallel for supplying energy to spaced points on said secondary distribution circuit, means for preventing the interchange of substantial energy between the feeder circuits of each of said pairs, and means for interrupting the parallel connection of each of said pairs of feeder circuits, said last-named means being responsive to the condition of said system when a fault occurs on a feeder circuit of one of said pairs of feeder circuits for interrupting the parallel connection of said one pair of feeder circuits.

76. In an electrical distribution system, a secondary distribution circuit, a plurality of primary feeder circuits for supplying energy to said secondary distribution circuit, a source of electrical energy, a main feeder circuit for supplying electrical energy from said source to said primary feeder circuits, a circuit breaker for controlling the connection of said main feeder circuit to said source, said circuit breaker having a predetermined time delay in opening, and a plurality of circuit interrupters for controlling the connections of said primary feeder circuits to said main feed circuit, one of said circuit interrupters being employed for each of said primary feeder circuits, and each of said circuit interrupters having a time delay in opening which is shorter than said predetermined time delay.

77. The method of distributing electrical energy which comprises transmitting energy from a source to a secondary distribution loop circuit over a plurality of feeder circuits, opening the distribution loop circuit adjacent a faulted feeder circuit for isolating the remainder of the loop circuit therefrom, disconnecting the source end of the faulted feeder circuit, and disconnecting the loop circuit end of the faulted feeder circuit from the loop circuit.

78. The method of distributing electrical energy which comprises transmitting energy from a source to a secondary distribution circuit over a plurality of feeder circuits, opening the distribution circuit adjacent a faulted feeder circuit for isolating the remainder of the distribution circuit therefrom, disconnecting the source end of the faulted feeder circuit, disconnecting the distribution circuit end of the faulted feeder circuit from the distribution circuit, and restoring the distribution circuit to its original condition for operation from the remainder of said feeder circuits.

JOHN S. PARSONS.